(12) United States Patent
Watanabe et al.

(10) Patent No.: US 10,866,929 B2
(45) Date of Patent: Dec. 15, 2020

(54) GROUP-BASED COMMUNICATION INTERFACE WITH SUBSIDIARY FILE COMMUNICATIONS

(71) Applicant: Slack Technologies, Inc., San Francisco, CA (US)

(72) Inventors: Milo Watanabe, San Francisco, CA (US); Ayesha Bose, San Francisco, CA (US); Bernadette Le, Concord, CA (US); Faisal Yaqub, San Francisco, CA (US); Fayaz Ashraf, Vancouver (CA); Marcel Weekes, San Francisco, CA (US); Wayne Fan, San Francisco, CA (US); Adam Cole, San Francisco, CA (US); Jordan Williams, San Francisco, CA (US); Patrick Kane, Vancouver (CA); Oluwatosin Afolabi, Vancouver (CA)

(73) Assignee: Slack Technologies, Inc., San Francisco, CA (US)

(*) Notice: Subject to any disclaimer, the term of this patent is extended or adjusted under 35 U.S.C. 154(b) by 208 days.

(21) Appl. No.: 16/177,184

(22) Filed: Oct. 31, 2018

(65) Prior Publication Data
US 2020/0026783 A1    Jan. 23, 2020

Related U.S. Application Data

(60) Provisional application No. 62/701,187, filed on Jul. 20, 2018.

(51) Int. Cl.
*G06F 16/176* (2019.01)
*G06F 3/0481* (2013.01)
(Continued)

(52) U.S. Cl.
CPC ........ *G06F 16/176* (2019.01); *G06F 3/04817* (2013.01); *G06Q 10/10* (2013.01);
(Continued)

(58) Field of Classification Search
USPC .......................................................... 707/608
See application file for complete search history.

(56) References Cited

U.S. PATENT DOCUMENTS

RE46,309 E  *  2/2017  Go ........................ G06F 9/451
9,722,891 B2 *  8/2017  Hanlon .................. G06Q 10/10
(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — Cam Linh T Nguyen
(74) *Attorney, Agent, or Firm* — Lee & Hayes, P.C.

(57) ABSTRACT

Provided is a group-based communication interface configured to efficiently share files among a plurality of group-based communication feeds. Each file share may initiate a subsidiary group-based communication feed to organize and manage discussions regarding shared files. The subsidiary group-based communication feed is unique to the particular file share. Subsequent file shares of the file initiate additional subsidiary group-based communication feeds, such that each discussion stemming from a file share does not overlap with another discussion regarding a different file share of the same file.

22 Claims, 19 Drawing Sheets

(51) Int. Cl.
G06Q 10/10 (2012.01)
H04L 29/06 (2006.01)
H04L 12/58 (2006.01)
H04L 29/08 (2006.01)
(52) U.S. Cl.
CPC .............. *H04L 51/04* (2013.01); *H04L 51/16* (2013.01); *H04L 65/1096* (2013.01); *H04L 67/06* (2013.01); *H04L 67/2804* (2013.01)

(56) References Cited

U.S. PATENT DOCUMENTS

| | | | | |
|---|---|---|---|---|
| 2005/0131924 | A1* | 6/2005 | Jones | G06F 16/283 |
| 2009/0254843 | A1* | 10/2009 | Van Wie | G06F 3/04815 |
| | | | | 715/757 |
| 2009/0282369 | A1* | 11/2009 | Jones | G06F 16/26 |
| | | | | 715/848 |
| 2010/0142542 | A1* | 6/2010 | Van Wie | H04L 67/38 |
| | | | | 370/400 |
| 2010/0205541 | A1* | 8/2010 | Rapaport | G06F 16/285 |
| | | | | 715/753 |
| 2010/0257450 | A1* | 10/2010 | Go | G06F 9/451 |
| | | | | 715/733 |
| 2014/0304505 | A1* | 10/2014 | Dawson | H04L 63/0428 |
| | | | | 713/165 |
| 2018/0287982 | A1 | 10/2018 | Draeger et al. | |

OTHER PUBLICATIONS

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience!, (2019) 13 pages.
"Die, Email, Diet A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications—", Fujitsu Sci. Tech. J., 36, 2, (Dec. 2000) 154-161.

* cited by examiner

US 10,866,929 B2

GROUP-BASED COMMUNICATION INTERFACE WITH SUBSIDIARY FILE COMMUNICATIONS

CROSS-REFERENCE TO RELATED APPLICATIONS

This application claims priority to and the benefit of U.S. Provisional Patent Application Ser. No. 62/701,187, entitled "Group-Based Communication Interface with Subsidiary File Communications" and filed on Jul. 20, 2018, the entire contents of which are hereby incorporated by reference.

BACKGROUND

Various messaging systems are available that allow users to have continuous conversations electronically between one another using applications running on client devices. In such systems, one or more users may send messages back and forth discussing various topics. In certain systems, the string of messages may be saved and later accessible to the participants of the conversation. Applicant has identified a number of deficiencies and problems associated with conventional messaging systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for facilitating a group-based communication interface. In some embodiments, an apparatus may be provided to share one or more files to a group-based communication interface including a plurality of group-based communication feeds, the apparatus including a processor, and a memory associated with the processor having computer coded instructions therein, with the computer coded instructions configured to, when executed by the processor, cause the apparatus to receive a first file share request comprising a first file identifier and a first specified group-based communication feed identifier. The first specified group-based communication feed identifier may be associated with a first specified group-based communication feed of the plurality of group-based communication feeds. The computer coded instructions may also be configured to, when executed by the processor, cause the apparatus to generate and display a first file summary avatar associated with the first file identifier to the first specified group-based communication feed associated with the first specified group-based communication feed identifier. The first file summary avatar may include a user engageable link for accessing a first file associated with the first file identifier. The computer coded instructions may be configured to, when executed by the processor, cause the apparatus to receive a first file thread request associated with the first file summary avatar, the first file thread request comprising the first file identifier, the first specified group-based communication feed identifier, and a first thread messaging communication. The computer coded instructions may be configured to, when executed by the processor, cause the apparatus to in response to receiving the first file thread request, generate and display the first thread messaging communication and a first thread file summary avatar in a subsidiary group-based communication feed associated with the first specified group-based communication feed, and generate and display a first thread summary indicator within the first specified group-based communication feed proximate the first file summary avatar.

In some embodiments, the computer coded instructions may be configured to, when executed by the processor, further cause the apparatus to receive a second file share request comprising a second file identifier and a second specified group-based communication feed identifier, where the second specified group-based communication feed identifier is associated with a second specified group-based communication feed of the plurality of group-based communication feeds; generate and display a second file summary avatar associated with the second file identifier to the second specified group-based communication feed associated with the second specified group-based communication feed identifier, where the second file summary avatar comprises a user engageable link for accessing a second file associated with the first file identifier; receive a second file thread request associated with the second file summary avatar, the second file thread request comprising the second file identifier, the second specified group-based communication feed identifier, and a second thread messaging communication; and in response to receiving the second file thread request, generate and display the second thread messaging communication and a second thread file summary avatar in a subsidiary group-based communication feed associated with the second specified group-based communication feed, and generate and display a second thread summary indicator within the second specified group-based communication feed proximate the second file summary avatar.

In some embodiments, the subsidiary group-based communication feed may be displayed in a thread communication pane in the group-based communication interface in response to receiving the first file thread request. In some embodiments, the first thread summary indicator may include a thread count and a latency indicator. In some embodiments, the first file share request may include an introductory messaging communication, wherein the introductory messaging communication is unique to the first file share request and the computer coded instructions are configured to, when executed by the processor, further cause the apparatus to display the introductory messaging communication proximate to the first file summary avatar in the first group-based communication feed and the first thread file summary avatar in the subsidiary group-based communication feed.

In some embodiments, the computer coded instructions may be configured to, when executed by the processor, further cause the apparatus to receive an introductory messaging communication edit request, receive an edited introductory messaging communication, delete the introductory messaging communication, and display the edited introductory messaging communication proximate to the first file summary avatar in the first group-based communication feed and the first thread file summary avatar in the subsidiary group-based communication feed.

In some embodiments, the computer coded instructions may be configured to, when executed by the processor, further cause the apparatus to receive a file detail request and in response to receipt of the file detail request, generate and display file detail information, where the file detail information indicates one or more group-based communication feeds that the specified group-based communication interface has permission to display and where at least one of a plurality of file summary avatars associated with the first file is displayed. In some embodiments, the file detail information may include a messaging communication count respective to each file summary avatar of the plurality of file summary avatars associated with the first file. In some embodiments, the computer coded instructions may be configured to, when executed by the processor, further cause the apparatus to receive a group-based communication feed request, the group-based communication feed request associated with a respective group-based communication feed, and in response to receipt of the group-based communication feed request, display the respective specified group-based communication feed.

In some embodiments, the computer coded instructions may be configured to, when executed by the processor, further cause the apparatus to receive a file share delete request; in response to the file share delete request, generate and display a confirmation indicator, the confirmation indicator confirming removal of accessibility of the first file through each file summary avatar of a plurality of file summary avatars associated with the first file, and where the confirmation indicator indicates each specified group-based communication feed in which the first file has been made accessible if the first file has been made accessible in more than one specified group-based communication feed or more than once within the respective specified group-based communication feed; and removing the accessibility of the first file through each file summary avatar.

In some embodiments, the computer coded instructions may be configured to, when executed by the processor, further cause the apparatus to receive a subsequent thread messaging communication in the thread communication pane and receive a broadcast request, the broadcast request configured to reproduce the subsequent thread messaging communication in the first specified group-based communication feed; and in response to receiving the broadcast request, reproduce the first thread file summary avatar and the subsequent thread messaging communication in the first specified group-based communication feed, wherein the first specified group-based communication feed is a group-based communication channel.

In some embodiments, the computer coded instructions may be configured to, when executed by the processor, further cause the apparatus to receive a third file share request comprising a third file identifier and a third specified group-based communication feed identifier, where the third specified group-based communication feed identifier is associated with a third specified group-based communication feed of the plurality of group-based communication feeds; generate and display a third file summary avatar associated with the third file identifier to the third specified group-based communication feed associated with the third specified group-based communication feed identifier, where the third file summary avatar comprises a user engageable link for accessing a third file associated with the third file identifier.

In some embodiments, the computer coded instructions may be configured to, when executed by the processor, further cause the apparatus to receive a thread reply request to reply to the third file summary avatar in the thread communication pane, the thread reply request associated with a third messaging communication; in response to receiving the thread reply request, generate and display the third messaging communication in the thread communication pane, wherein the third messaging communication is associated with the third file summary avatar and the first file summary avatar.

In some embodiments, the computer coded instructions may be configured to, when executed by the processor, further cause the apparatus to receive a file update request, the file update request being associated with a change to the first file, and in response to receiving a file update request, generate and display a revised file summary avatar in the first specified group-based communication feed, the revised file summary avatar comprising the change to the first file and replacing the first file summary avatar.

In some embodiments, the computer coded instructions may be configured to, when executed by the processor, further cause the apparatus to display messaging communication information associated with the first messaging communication in the thread communication pane.

In some embodiments, the computer coded instructions may be configured to, when executed by the processor, further cause the apparatus to receive a profile identifier with a third messaging communication in the thread communication pane, wherein the profile identifier is configured to associate the third messaging communication with a user of the selected group-based communication interface; display the profile identifier with the third messaging communication to the thread communication pane; and in response to receiving the profile identifier in the thread communication pane, update a thread indication in a channel list pane of the selected group-based communication interface, the thread indication configured to indicate that the profile identifier was received in the thread communication pane.

In some embodiments, the computer coded instructions may be configured to, when executed by the processor, further cause the apparatus to receive a thread summary view request and, in response to receiving the thread summary view request, presenting at least a portion of the first file summary avatar in a thread summary communication pane.

In some embodiments, the computer coded instructions may be configured to, when executed by the processor, further cause the apparatus to, in response to receiving the thread summary view request, present a notification in the thread summary communication pane, where the notification is configured to indicate the receipt of new messaging communications in the thread communication pane, the new messaging communications being messaging communications that a thread-associated user profile has not yet viewed. In some embodiments, the computer coded instructions may be configured to, when executed by the processor, further cause the apparatus to receive a selected file thread view request, the selected file thread view request associated with a selected file summary avatar, and, in response to receiving the selected file thread view request, presenting the selected file summary avatar and any messaging communication unique to the selected file summary avatar.

In some embodiments, the first file share request may include a second file identifier and the computer coded instructions are configured to, when executed by the processor, further cause the apparatus to generate and display a second file summary avatar associated with the second file identifier to the first specified group-based communication feed, where the second file summary avatar comprises a user engageable link for accessing the second file associated with the second file identifier.

Another embodiment of the present invention provided is a method to share one or more files to a group-based communication interface comprising a plurality of group-based communication feeds. In some embodiments, the method may include receiving a first file share request comprising a first file identifier and a first specified group-based communication feed identifier. The first specified group-based communication feed identifier may be associated with a first specified group-based communication feed of the plurality of group-based communication feeds. In some embodiments, the method may include generating and displaying a first file summary avatar associated with the first file identifier to the first specified group-based communication feed associated with the first specified group-based communication feed identifier. The first file summary avatar may include a user engageable link for accessing a first file associated with the first file identifier. In some embodiments, the method may include receiving a first file thread request associated with the first file summary avatar, the first file thread request comprising the first file identifier, the first specified group-based communication feed identifier, and a first thread messaging communication; and in response to receiving the first file thread request, generating and displaying the first thread messaging communication and a first thread file summary avatar in a subsidiary group-based communication feed associated with the first specified group-based communication feed, and generating and displaying a first thread summary indicator within the first specified group-based communication feed proximate the first file summary avatar.

In some embodiments, the method may include receiving a second file share request including a second file identifier and a second specified group-based communication feed identifier. The second specified group-based communication feed identifier may be associated with a second specified group-based communication feed of the plurality of group-based communication feeds. In some embodiments, the method may include generating and displaying a second file summary avatar associated with the second file identifier to the second specified group-based communication feed associated with the second specified group-based communication feed identifier. The second file summary avatar may include a user engageable link for accessing a second file associated with the first file identifier. In some embodiments, the method may include receiving a second file thread request associated with the second file summary avatar, the second file thread request including the second file identifier, the second specified group-based communication feed identifier, and a second thread messaging communication. In some embodiments, the method may include, in response to receiving the second file thread request, generating and displaying the second thread messaging communication and a second thread file summary avatar in a subsidiary group-based communication feed associated with the second specified group-based communication feed, and generating and displaying a second thread summary indicator within the second specified group-based communication feed proximate the second file summary avatar.

In some embodiments, the subsidiary group-based communication feed may be displayed in a thread communication pane in the group-based communication interface in response to receiving the first file thread request. In some embodiments, the first thread summary indicator may include a thread count and a latency indicator.

In some embodiments, the first file share request may include an introductory messaging communication, wherein the introductory messaging communication is unique to the first file share request and the method includes displaying the introductory messaging communication proximate to the first file summary avatar in the first group-based communication feed and the first thread file summary avatar in the subsidiary group-based communication feed.

In some embodiments, the method may include receiving an introductory messaging communication edit request, receiving an edited introductory messaging communication, deleting the introductory messaging communication, and displaying the edited introductory messaging communication proximate to the first file summary avatar in the first group-based communication feed and the first thread file summary avatar in the subsidiary group-based communication feed.

In some embodiments, the method may include receiving a file detail request and in response to receipt of the file detail request, generating and displaying file detail information, wherein the file detail information indicates one or more group-based communication feeds that the specified group-based communication interface has permission to display and where at least one of a plurality of file summary avatars associated with the first file is displayed. In some embodiments, the file detail information may include a messaging communication count respective to each file summary avatar of the plurality of file summary avatars associated with the first file.

In some embodiments, the method may include receiving a group-based communication feed request, the group-based communication feed request associated with a respective group-based communication feed, and in response to receipt of the group-based communication feed request, displaying the respective specified group-based communication feed.

In some embodiments, the method may include receiving a file share delete request; in response to the file share delete request, generating and displaying a confirmation indicator, the confirmation indicator confirming removal of accessibility of the first file through each file summary avatar of a plurality of file summary avatars associated with the first file, and where the confirmation indicator indicates each specified group-based communication feed in which the first file has been made accessible if the first file has been made accessible in more than one specified group-based communication feed or more than once within the respective specified group-based communication feed; and removing the accessibility of the first file through each file summary avatar.

In some embodiments, the method may include receiving a subsequent thread messaging communication in the thread communication pane and receiving a broadcast request, the broadcast request configured to reproduce the subsequent thread messaging communication in the first specified group-based communication feed; and in response to receiving the broadcast request, reproducing the first thread file summary avatar and the subsequent thread messaging communication in the first specified group-based communication feed, where the first specified group-based communication feed is a group-based communication channel.

In some embodiments, the method may include receiving a third file share request comprising a third file identifier and a third specified group-based communication feed identifier, where the third specified group-based communication feed identifier is associated with a third specified group-based communication feed of the plurality of group-based communication feeds; generating and displaying a third file summary avatar associated with the third file identifier to the third specified group-based communication feed associated with the third specified group-based communication feed identifier, where the third file summary avatar comprises a user engageable link for accessing a third file associated with the third file identifier.

In some embodiments, the method may include receiving a thread reply request to reply to the third file summary avatar in the thread communication pane, the thread reply request associated with a third messaging communication; in response to receiving the thread reply request, generating and displaying the third messaging communication in the thread communication pane, wherein the third messaging communication is associated with the third file summary avatar and the first file summary avatar.

In some embodiments, the method may include receiving a file update request, the file update request being associated with a change to the first file, and in response to receiving a file update request, generating and displaying a revised file summary avatar in the first specified group-based communication feed, the revised file summary avatar comprising the change to the first file and replacing the first file summary avatar.

In some embodiments, the method may include displaying messaging communication information associated with the first messaging communication in the thread communication pane.

In some embodiments, the method may include receiving a profile identifier with a third messaging communication in the thread communication pane, where the profile identifier is configured to associate the third messaging communication with a user of the selected group-based communication interface; displaying the profile identifier with the third messaging communication to the thread communication pane; and in response to receiving the profile identifier in the thread communication pane, updating a thread indication in a channel list pane of the selected group-based communication interface, the thread indication configured to indicate that the profile identifier was received in the thread communication pane.

In some embodiments, the method may include receiving a thread summary view request and, in response to receiving the thread summary view request, presenting at least a portion of the first file summary avatar in a thread summary communication pane.

In some embodiments, the method may include, in response to receiving the thread summary view request, presenting a notification in the thread summary communication pane, where the notification is configured to indicate the receipt of new messaging communications in the thread communication pane, the new messaging communications being messaging communications that a thread-associated user profile has not yet viewed.

In some embodiments, the method may include receiving a selected file thread view request, the selected file thread view request associated with a selected file summary avatar, and, in response to receiving the selected file thread view request, presenting the selected file summary avatar and any messaging communication unique to the selected file summary avatar.

In some embodiments, the first file share request may include a second file identifier and the method may include generating and displaying a second file summary avatar associated with the second file identifier to the first specified group-based communication feed, where the second file summary avatar includes a user engageable link for accessing the second file associated with the second file identifier.

In yet another example embodiment, a computer program product to share one or more files to a group-based communication interface may be provided. The computer program product may include a non-transitory computer readable medium having computer program instructions stored therein, said computer program instructions, when executed by a processor, cause the computer program product to receive a first file share request comprising a first file identifier and a first specified group-based communication feed identifier, wherein the first specified group-based communication feed identifier is associated with a first specified group-based communication feed of the plurality of group-based communication feeds; generate and display a first file summary avatar associated with the first file identifier to the first specified group-based communication feed associated with the first specified group-based communication feed identifier, wherein the first file summary avatar comprises a user engageable link for accessing a first file associated with the first file identifier; receive a first file thread request associated with the first file summary avatar, the first file thread request comprising the first file identifier, the first specified group-based communication feed identifier, and a first thread messaging communication; and in response to receiving the first file thread request, generate and display the first thread messaging communication and a first thread file summary avatar in a subsidiary group-based communication feed associated with the first specified group-based communication feed, and generate and display a first thread summary indicator within the first specified group-based communication feed proximate the first file summary avatar.

In some embodiments, the computer program instructions may be configured to, when executed by the processor, further cause the computer program product to receive a second file share request comprising a second file identifier and a second specified group-based communication feed identifier, wherein the second specified group-based communication feed identifier is associated with a second specified group-based communication feed of the plurality of group-based communication feeds; generate and display a second file summary avatar associated with the second file identifier to the second specified group-based communication feed associated with the second specified group-based communication feed identifier, wherein the second file summary avatar comprises a user engageable link for accessing a second file associated with the first file identifier; receive a second file thread request associated with the second file summary avatar, the second file thread request comprising the second file identifier, the second specified group-based communication feed identifier, and a second thread messaging communication; and in response to receiving the second file thread request, generate and display the second thread messaging communication and a second thread file summary avatar in a subsidiary group-based communication feed associated with the second specified group-based communication feed, and generate and display a second thread summary indicator within the second specified group-based communication feed proximate the second file summary avatar.

In some embodiments, the subsidiary group-based communication feed may be displayed in a thread communication pane in the group-based communication interface in response to receiving the first file thread request. In some embodiments, the first thread summary indicator may include a thread count and a latency indicator.

In some embodiments, the first file share request may include an introductory messaging communication, where the introductory messaging communication is unique to the first file share request and the computer program instructions are configured to, when executed by the processor, further cause the computer program product to display the introductory messaging communication proximate to the first file summary avatar in the first group-based communication feed and the first thread file summary avatar in the subsidiary group-based communication feed. In some embodiments, the computer program instructions are configured to, when executed by the processor, further cause the computer program product to receive an introductory messaging communication edit request, receive an edited introductory messaging communication, delete the introductory messaging communication, and display the edited introductory messaging communication proximate to the first file summary avatar in the first group-based communication feed and the first thread file summary avatar in the subsidiary group-based communication feed.

In some embodiments, the computer program instructions may be configured to, when executed by the processor, further cause the computer program product to receive a file detail request and in response to receipt of the file detail request, generate and display file detail information, wherein the file detail information indicates one or more group-based communication feeds that the specified group-based communication interface has permission to display and wherein at least one of a plurality of file summary avatars associated with the first file is displayed. In some embodiments, the file detail information may include a messaging communication count respective to each file summary avatar of the plurality of file summary avatars associated with the first file.

In some embodiments, the computer program instructions may be configured to, when executed by the processor, further cause the computer program product to receive a group-based communication feed request, the group-based communication feed request associated with a respective group-based communication feed, and in response to receipt of the group-based communication feed request, display the respective specified group-based communication feed.

In some embodiments, the computer program instructions may be configured to, when executed by the processor, further cause the computer program product to receive a file share delete request; in response to the file share delete request, generate and display a confirmation indicator, the confirmation indicator confirming removal of accessibility of the first file through each file summary avatar of a plurality of file summary avatars associated with the first file, and wherein the confirmation indicator indicates each specified group-based communication feed in which the first file has been made accessible if the first file has been made accessible in more than one specified group-based communication feed or more than once within the respective specified group-based communication feed; and removing the accessibility of the first file through each file summary avatar.

In some embodiments, the computer program instruction may be configured to, when executed by the processor, further cause the computer program product to receive a subsequent thread messaging communication in the thread communication pane and receive a broadcast request, the broadcast request configured to reproduce the subsequent thread messaging communication in the first specified group-based communication feed; and in response to receiving the broadcast request, reproduce the first thread file summary avatar and the subsequent thread messaging communication in the first specified group-based communication feed, wherein the first specified group-based communication feed is a group-based communication channel.

In some embodiments, the computer program instructions are configured to, when executed by the processor, further cause the computer program product to receive a third file share request comprising a third file identifier and a third specified group-based communication feed identifier, wherein the third specified group-based communication feed identifier is associated with a third specified group-based communication feed of the plurality of group-based communication feeds; generate and display a third file summary avatar associated with the third file identifier to the third specified group-based communication feed associated with the third specified group-based communication feed identifier, wherein the third file summary avatar comprises a user engageable link for accessing a third file associated with the third file identifier.

In some embodiments, the computer program instructions may be configured to, when executed by the processor, further cause the computer program product to receive a thread reply request to reply to the third file summary avatar in the thread communication pane, the thread reply request associated with a third messaging communication; and in response to receiving the thread reply request, generate and display the third messaging communication in the thread communication pane, wherein the third messaging communication is associated with the third file summary avatar and the first file summary avatar.

In some embodiments, the computer program instructions may be configured to, when executed by the processor, further cause the computer program product to receive a file update request, the file update request being associated with a change to the first file, and in response to receiving a file update request, generate and display a revised file summary avatar in the first specified group-based communication feed, the revised file summary avatar comprising the change to the first file and replacing the first file summary avatar.

In some embodiments, the computer program instructions may be configured to, when executed by the processor, further cause the computer program product to display messaging communication information associated with the first messaging communication in the thread communication pane. In some embodiments, the computer program instructions may be configured to, when executed by the processor, further cause the computer program product to receive a profile identifier with a third messaging communication in the thread communication pane, wherein the profile identifier is configured to associate the third messaging communication with a user of the selected group-based communication interface; display the profile identifier with the third messaging communication to the thread communication pane; and in response to receiving the profile identifier in the thread communication pane, update a thread indication in a channel list pane of the selected group-based communication interface, the thread indication configured to indicate that the profile identifier was received in the thread communication pane.

In some embodiments, the computer program instructions may be configured to, when executed by the processor, further cause the computer program product to receive a thread summary view request and, in response to receiving the thread summary view request, present at least a portion of the first file summary avatar in a thread summary communication pane.

In some embodiments, the computer program instructions may be configured to, when executed by the processor, further cause the computer program product to, in response to receiving the thread summary view request, present a notification in the thread summary communication pane, wherein the notification is configured to indicate the receipt of new messaging communications in the thread communication pane, the new messaging communications being messaging communications that a thread-associated user profile has not yet viewed.

In some embodiments, the computer program instructions may be configured to, when executed by the processor, further cause the computer program product to receive a selected file thread view request, the selected file thread view request associated with a selected file summary avatar, and, in response to receiving the selected file thread view request, present the selected file summary avatar and any messaging communication unique to the selected file summary avatar.

In some embodiments, the first file share request may include a second file identifier and the computer program instructions are configured to, when executed by the processor, further cause the computer program product to generate and display a second file summary avatar associated with the second file identifier to the first specified group-based communication feed, wherein the second file summary avatar comprises a user engageable link for accessing the second file associated with the second file identifier.

BRIEF DESCRIPTION OF THE FIGURES

Reference will now be made to the accompanying drawings, which are not necessarily drawn to scale, and wherein.

DETAILED DESCRIPTION

Figure 1:
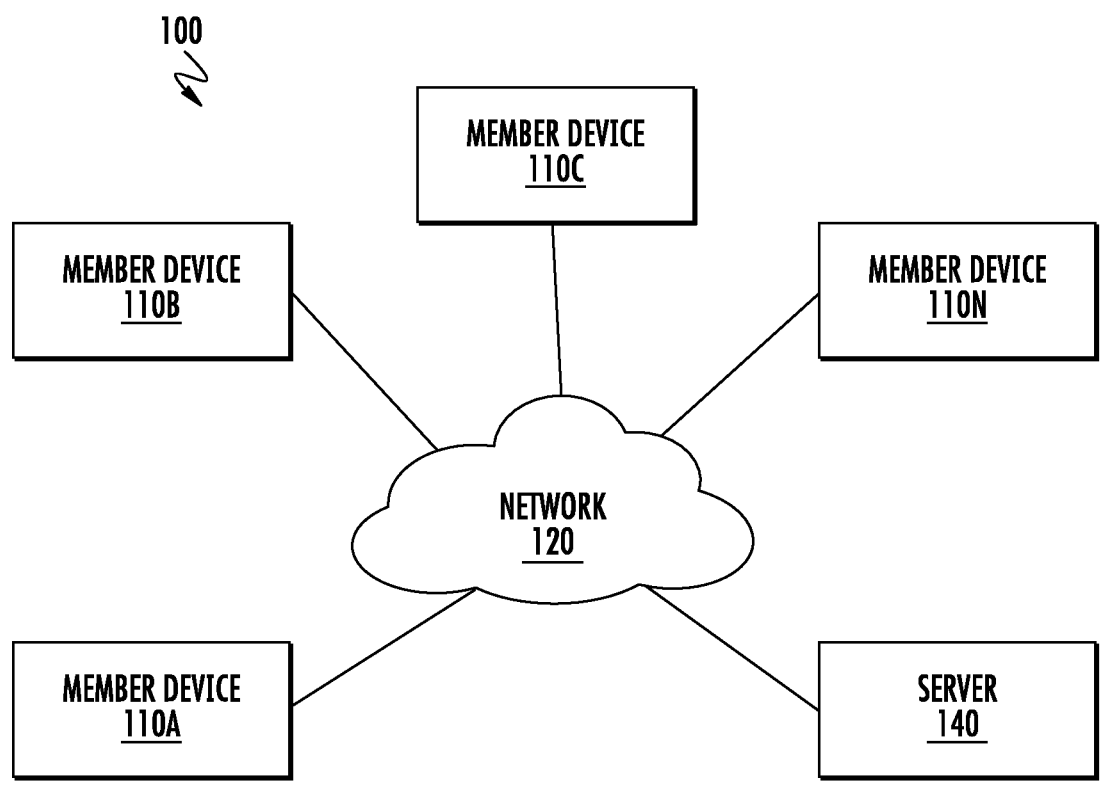
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "file" refers to a packet of data treated as a unit, such as a web page (e.g., .htm, .html, etc.), pdf (e.g., .pdf), graphic or photo (e.g., .jpg, .jpeg, etc.), Microsoft Word document (e.g., .doc, .docx, etc.), Microsoft Excel file (e.g., .xls, .xlsx, .xlsm, .xlsb, etc.), Box file, Dropbox file, Google Drive file, etc. and may store pictures, words, videos, computer programs, and combinations thereof. The files may be uploaded to the group-based communication interface or may be cloud or remotely stored files (e.g., GoogleDoc, GitHub, etc.) and app session pointers. That is, the files may be stored to a memory or database associated with the group-based communication system and/or may be stored to a memory or database associated with a remote resource (e.g., a software program, application, platform, service, etc. that is configured to communicate with the group-based communication system for providing service to a client device via a group-based communication interface). In some embodiments, the file may be stored to a remove data object address, which may be a uniform resource locator (URL), an internet address, or an intranet domain.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

As used herein, the term "group-based communication feed" refers to a virtual communications environment or stream of communications that is configured to display messaging communications posted by members (e.g., validated users accessing the environment using client devices) that are viewable only to the members of the group. As discussed herein, the group-based communication interface may include various types of group-based communication feeds, which may have subsidiary group-based communication feeds. For instance, the group-based communication interface may include group-based communication channels, threads, direct messages, and other collections of messaging communications.

A "group-based communication channel" refers to a virtual communications environment that is configured to display messaging communications posted by channel members (e.g., validated users accessing the environment using client devices) that are viewable only to the members of the group. In the hierarchy of group-based communication feeds, group-based communication channels the generally the main group-based communication feeds, with threads being a subsidiary group-based communication feed started from a group-based communication channel and direct messages being a group-based communication feed between two parties.

The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

A "thread" is a collection of communication messages displayed to a subsidiary feed arising from or otherwise associated with a selected group-based messaging communication displayed in a selected group-based communication channel. A thread may include one or more "threaded messages" or "thread communication messages" that are linked together in the subsidiary feed, wherein each is associated with the selected group-based messaging communication. In some embodiments, a file thread request may be received. The file thread request may request the creation of a file thread. The file thread request may include a thread communication message or may initiate a thread in which a thread communication message is then received. A "file thread" refers to a thread created from the sharing of a file (generally referred to as a "file share"). A single file may be shared multiple times with each instance of sharing being referred to as a unique file share. Each file share is initiated by a unique file share request and leads to the generation and display of a unique file summary avatar and which may be presented with an introductory messaging communication unique to the file share request.

A "direct message" is a collection of communication messages between two users of the group-based communication system.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the term "profile identifier" refers to any data that identifies a user. For example, and without limitation, a profile identifier may include a unique identifier, an IP address, a MAC address, and the like. In some embodiments, the profile identifier may be "highlight words" which are words/terms that a member requests to follow. For instance, when a highlight word is used in a thread communication message, the associated member may be notified of such communication (e.g., by displaying a thread indication as discussed herein).

As used herein, a "thread-associated user profile" refers to a user profile that is associated with the respective thread. A "channel-associated user profile" refers to a user profile that is associated with the respective channel. For instance, if a member follows a thread, then the member will be considered a thread-associated user profile.

As used herein, the term "profile data" refers to any data associated with a profile identifier, such as, but not limited to, biographical data or any other data that may serve to distinguish one or more profiles from each other.

As used herein, the term "biographical data" refers to information associated with a person(s) identified in a profile, such as, for example, birth dates, allergies, socioeconomic data, interests, place of residence, login credential information, and/or any other identifying information about a profile.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

The term "group-based communication feed identifier" refers to one or more items of data by which a group-based communication feed may be identified. For example, a group-based communication feed identifier may comprise ASCII text, a pointer, a memory address, and the like.

The term "file identifier" refers to one or more items of data by which a file may be identified. For example, a file identifier may comprise ASCII text, a pointer, a memory address, and the like.

The term "file detail identifier" refers to one or more items of data by which a file detail view may be identified. For example, a file detail identifier may comprise ASCII text, a pointer, a memory address, and the like.

As used herein, the terms "messaging communication," "communication message," and "message" refer to any electronically generated digital content object provided by a user using a client device and that is configured for display within a group-based communication channel. Message communications may include any text provided by a user (using a client device). For instance, the user may provide a messaging communication that includes text within the messaging communication as message contents. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "new messaging communication" or a new communication message is a communication that the selected group-based communication interface has not yet presented to a particular member (that is, the member viewing the interface).

Because a thread is linked to a selected group-based messaging communication it arises in the context of a particular group-based communication channel. However, the thread is presented separately from the group-based messaging communications displayed within the selected group-based communication channel. Thread communication messages received in the thread are not automatically displayed in the selected group-based communication channel. Instead, the selected group-based communication channel is updated with a thread summary indicator that is configured to indicate that the thread was established and to indicate the receipt of subsequent thread communication messages in the thread. In some embodiments, a member can choose to override this such that the thread communication message also appears in the selected group-based communication channel.

The term "feed summary indicator" refers to a visual identifier that indicates that an action has been taken with regards to a group-based communication feed (e.g., a feed has been created, a communication message has been received in the feed, and/or that a profile identifier was received in the feed).

As used herein, "thread summary indicator" refers to a visual identifier that indicates that an action has been taken with regards to a thread (e.g., a thread has been created, a thread communication message has been received in the thread, and/or that a profile identifier was received in the thread). A "notification" is a specific indication configured to indicate the number of new messaging communications (e.g., new thread communication message) and new threads that the selected group-based communication interface has not yet presented to a particular member (that is, the member viewing the interface).

As used herein, "defined display window" is a defined area in the selected group-based communication interface where information is displayed. A "channel list pane" is a display pane configured to display lists of group-based communication channels and/or threads that are configured to indicate when new messaging communications are received in the respective threads and/or group-based communication channels. The channel list pane may include actuators for initiating requests to view selected group-based communication channels and/or a summary of selected threads. The channel list pane may include additional information, such as messaging communication information, notifications, the name of the group, name of the particular member viewing the interface, etc. A "thread communication pane" is a display pane that is configured to display a selected thread. The thread communication pane may include a variety of information, such as messaging communication information, and may include a variety of actuators for initiating requests. A "thread summary communication pane" is a display pane that is configured to display a summary of threads that the particular member follows. The summary typically includes at least a portion of one or more thread communication messages as well as at least a portion of the selected group-based messaging communications from which the thread was created. The thread summary communication pane may also display various notifications, actuators, and indicators/indications. A channel messaging pane is a display pane configured to display a selected group-based communication channel and may display a variety of information and a variety of notifications, actuators, and indicators/indications.

As used herein, "messaging communication information" refers to any information and/or metadata that is associated with the messaging communication, such as information related to the user who created the messaging communication, the group-based communication channel on which the messaging communication was first provided or is associated with (e.g., the name of the group-based communication channel), the time and date that the messaging communication was first provided, threads stemming from the messaging communication (e.g., date and time the thread was made or last received a messaging communication, etc.), and any other identifying information related to the messaging communication.

As used herein, "request" refers to an instruction or direction, generally initiated by a user, for an action to take place. For instance, a user may request to create a thread (e.g., thread request), view a summary of threads the user follows (e.g., thread summary view request), view profile data of another user, view certain messaging communication information, share a select thread communication message from a thread to the selected group-based communication channel from which the thread was created (e.g., broadcast request), receive notifications regarding a thread (e.g., follow request), notify a selected member of a thread communication message (e.g., follow request), share a file (e.g., file share request), reply to a shared file (e.g., file thread request), edit an introductory message to a shared file (e.g., introductory messaging communication edit request), view information regarding each instance a file was shared (e.g., file detail request), delete a shared file (e.g., file share delete request), change the information regarding a file (e.g., file update request), view specific instances where a file was shared (e.g., selected file thread view request), view a selected group-based communication feed request (e.g., group-based communication feed request, or more specifically selected channel view request, selected thread view request), etc.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

As used herein, the term "file summary avatar" refers to one or more items of data by which a file within a group-based communication system may be identified. The file summary avatar may be a graphical representation (e.g., an image file), icon, logo, tombstone, figure, or the like that represents a file and is rendered within a group-based communication interface. The file summary avatar may comprise ASCII text, a pointer, a memory address, and the like. The file summary avatar may be rendered based at least in part on metadata received from the cloud or remotely stored files (e.g., GoogleDoc, GitHub, etc.). In some embodiments, changes may be made to the file (e.g., title, contents, etc.). In such cases, a "revised file summary avatar" may be generated and displayed instead of the original file summary avatar. In some embodiments, the file summary avatar may include an actuator to access the file (e.g., a link to download or retrieve the file) and may thus be a user engageable link. That is, the file summary avatar may be a user engageable link that is configured to allow a user to interact with or update an associated file. Depending on where the file summary avatar is located, the file summary avatar may be a thread file summary avatar (e.g., located in a thread), a channel file summary avatar (e.g., located in a group-based communication channel), a direct message file summary avatar (e.g., located in a direct message), etc. The file summary avatar may include metadata comprising the following: a sending user identifier (e.g., identifier for the user who initiated the file share request), a file identifier, a group identifier, a group-based communication feed identifier, etc.

As used herein, the phrase "made accessible" or "make accessible" refers to the ability to view the contents of the item, such as a file. A file summary avatar may make a file accessible to users by providing a link to download or retrieve the file.

"Introductory messaging communication" refers to a messaging communication that may be added with the file when a file is shared, and is generally a group-based messaging communication. The introductory messaging communication may appear with the file summary avatar in the group-based communication feed in which the file is shared. The introductory messaging communication is generally unique to the file share request. That is, each file share request will lead to a unique introductory messaging communication with the unique file summary avatar. Subsequent file share requests for that file will initiate the creation of a new introductory messaging communication. The introductory messaging communication may be a channel-based introductory messaging communication (e.g., the introductory messaging communication is displayed in a group-based communication), a thread-based introductory messaging communication (e.g., the introductory messaging communication is displayed in a thread), or a direct-message-based introductory messaging communication (e.g., the introductory messaging communication is displayed in a direct message). The introductory messaging communication may be edited, resulting in an edited introductory messaging communication. The introductory messaging communication may include metadata comprising the following: a sending user identifier (e.g., identifier for the user who initiated the file share request), a file identifier, a group identifier, a group-based communication feed identifier, etc.

"File detail information" refers to information regarding the respective file across various instances of file sharing. That is, the file detail information will contain information regarding each file share request (and corresponding file summary avatar) that the user viewing the group-based communication interface has permission to view. Private sharing of files will generally not be viewed on the file detail information when requested by a user that does not have permission to access the private group-based communication feed in which the file was shared.

"Confirmation indicator" refers to a message that requests that an action be confirmed before proceeding (e.g., deleting the sharing of a file). The confirmation indicator may appear as a pop-up message, email message, etc.

Overview

Various embodiments of the invention are directed to systems and devices that are configured to efficiently share files in a selected group-based communication interface (e.g., a user interface that is configured for messaging communications for a given enterprise such as ACME Corp) from a plurality of group-based communication interfaces (e.g., user interfaces that are configured for messaging communications of other enterprises such as Beta Corp or Charlie Corp). The selected group-based communication interface includes a plurality of group-based communication channels (e.g., a marketing channel, sales channel, accounting channel, etc.). The selected group-based communication interface is accessible and viewable to a select group of users, such as a group of employees of a business or organization (e.g., the ACME Corp interface would be accessible and viewable to ACME Corp employees but not to Beta Corp employees).

The selected group-based communication interface is updated and arranged per the actions of the members of that group-based communication interface and is separate and distinct from other group-based communication interfaces.

The selected group-based communication interface is configured to share files among group-based communication feeds (e.g., group-based communication channels, threads, etc.) efficiently and effectively. In prior systems, files may be shared with comments regarding such files. At each subsequent sharing of the file, the comments may be displayed. For example, a video may be shared in one conversation sparking comments regarding that video. Subsequent sharing of the video would result in those comments being reproduced along with the subsequent sharing of the video. In many cases, the comments were irrelevant, confusing, or otherwise inappropriate for the conversation in which the subsequent sharing occurred. In some cases, the comments were initially private, but made public when the file was re-shared. In addition, a user was unable to determine where the file had been shared.

In the present disclosure, the selected group-based communication interface may be configured to generate and display a subsidiary group-based communication feed each time a file is shared. For example, in some embodiments, in response to a file share request, a file summary avatar may be generated and displayed. The file summary avatar may provide access to the file to the users of the group-based communication feed in which the file share request was created. Additional messaging communications received in response to the file summary avatar are linked to the file summary avatar and file share request. However, subsequent file share requests initiate new file summary avatars such that the messaging communications associated with the first file summary avatar are not reproduced with the subsequent sharing of the file in the group-based communication feed in which the subsequent file share request was created. Despite the sharing of the same file in multiple locations in the group-based communication interface, each instance of sharing allows for a new conversation (e.g., new subsidiary group-based communication feed) and does not cloud the new conversation with prior comments regarding the file. With subsequent file share requests, additional file summary avatars are generated and displayed in respective specified group-based communication feeds. The first messaging communication is unique to the first file summary avatar despite the creation of the subsequent file share requests. By doing so, the group-based communication interface can efficiently and effectively share files among different group-based communication feeds.

In some embodiments, the group-based communication interface may include a file detail view to display information regarding each instance a file was shared. For instance, the file detail view may list each group-based communication feed in which the file has been shared, the time of such sharing, the number of replies to such sharing, what user shared the file, links to access such sharing, etc., and combinations thereof. With the file detail view, a user can easily and efficiently access various information regarding the file and then access specific files shares if desired.

In some embodiments, a file may be shared within a thread. The thread may be started from another file share or from a messaging communication. When a file is shared to a thread, initiating the generation and display of a file summary avatar, subsequent messaging communications received in the thread are associated with the file summary avatar.

In some embodiments, a member may share a file that was not originally uploaded by the member. The member that did originally upload the file may receive a message to allow such sharing.

In some embodiments, the group-based communication interface may be searched to locate files and file shares. In some embodiments, file shares may be deleted. That is, a user may delete a shared file in certain group-based communication feeds or in each group-based communication feed in which the file was shared. In some embodiments, deleting a shared file may not delete the file itself from the group-based communication interface and may remove access to the file from the file summary avatars for that file.

With the group-based communication interface, only those users that have the proper credentials may access files. That is, the group-based communication interface prevents accidently sharing a file with a user who does not have the proper credentials to view the file (e.g., the user is outside of the organization, the user is not a member to the specified group-based communication feed, etc.). The group-based communication interface also prevents accidently sharing comments regarding a file with a user who does not have the proper credentials to view the comments (e.g., the user is outside of the organization, the user is not a member to the specified group-based communication feed, etc.).

In some embodiments, the group-based communication interface may allow users to follow file threads. Thus, a user can view subsequent messaging communications made in response to file shares.

Each of the plurality of group-based communication channels in the selected group-based communication interface may include one or more group-based messaging communications, or may be empty (in that the selected group-based communication channel may not contain a group-based messaging communication at a certain point in time).

The selected group-based communication interface is configured to receive requests to create threads or subsidiary communication messages stemming from file shares in group-based communication feeds. The selected group-based communication interface is configured to display the subsidiary group-based communication feed in a separate feed from the selected group-based communication feed. Communication messages can be received in the subsidiary group-based communication feed allowing the conversation to continue. The selected group-based communication interface can thereby allow for relegating of conversations, such as those that relate to a specific file, a minor issue related to the file, or to an issue related to the file and particular to certain members of the group-based communication channel, to a separate display pane, where the conversations can continue, while also maintaining a focused conversation in the selected group-based communication feed.

At the same time, the selected group-based communication feed is updated to indicate that the subsidiary group-based communication feed was created and to present a count of how many communications have been received in the subsidiary group-based communication feed, allowing feed members to access the subsidiary group-based communication feed if desired. The selected group-based communication interface thereby is configured to allow for the selected group-based communication feed (and all interested members thereof) to be informed of the relegated conversation (i.e., the subsidiary group-based communication feed). Accordingly, the selected group-based communication interface provides for efficient and focused group-based communications.

In some embodiments, the selected group-based communication interface is also configured to receive a broadcast request and reproduce the desired thread communication and file share in the selected group-based communication channel. Members of the selected group-based communication channels are thereby informed when important or relevant information is received in the thread (e.g., information regarding a decision or activity relevant to other members of the selected group-based communication channel related to the file). A member of the selected group-based communication channel can access the full thread at any time by selecting a thread summary indicator presented in the selected group-based communication channel. A member of the selected group-based communication channel can also access the full thread at any time by selecting a thread communication message that has been broadcasted back to the selected group-based communication channel.

The selected group-based communication interface thereby efficiently and effectively shares files among an interface for group-based communications. Group-based messaging communications within the plurality of group-based communication feeds can be relegated to subsidiary group-based communication feeds to continue conversations regarding files without congesting the selected group-based communication feed with side conversations, while also informing the members of the selected group-based communication feed that the side conversation is or has taken place and allowing those members to access and view the side conversations.

Pertinent information in the subsidiary group-based communication feed can be shared to the selected group-based communication feed further keeping all members "in the loop" with relevant information. This allows members of the group-based communication interface to spend less time reading and reviewing irrelevant information and allows a member to quickly access relevant information, thereby increasing the efficiency and effectiveness of group-based messaging communications. Further, members of the group-based communication interface may only be notified of subsidiary group-based communication feed under certain circumstances. Thus, members of group-based communication feeds may not receive notifications for irrelevant information. With more focused monitoring by the members of the group-based communication feeds and a reduced amount of notifications to the members of the group-based communication feeds, there will be less strain on the system itself leading to increased lifetime and efficiency. The group-based communication interface also provides reduced network traffic and data processing by moving communication messages to a subsidiary group-based communication feed rather than including in the group-based communication feed, and reproducing each messaging communication associated with a file each time the file is shared. The group-based communication interface provides reduced client data storage as communication messages in the subsidiary group-based communication feed are not necessarily downloaded from the server for viewing in the group-based communication feed each time a file is shared.

The selected group-based communication interface is configured to allow members of the interface to communicate within group-based communication feeds and share files within group-based communication feeds to provide relevant information to other members efficiently and effectively. The selected group-based communication interface thereby efficiently and effectively provides an interface for group-based communications rooted in computer technology in order to overcome a problem specifically arising in the realm of computer networks. The selected group-based communication interface may be used as part of a standalone service, application, or device or it may be applied as a layer atop an existing service application or device.

As will be discussed in greater detail below, the selected group-based communication interface is not limited to displaying group-based messaging communications and can also be configured to display a wide variety of messaging communications for any purpose that might be of interest to a member. The selected group-based communication interface may be used to visualize any set of group-based communication feeds and messaging communications for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messaging communications on a selected group-based communication interface.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. For example, system 100 may include server 140, which can include, for example, the circuitry disclosed in FIGS. 2-3B, a server, or database, among other things (not shown). The server 140 may include any suitable network server and/or other type of processing device. In some embodiments, the server 140 may determine and transmit commands and instructions for rendering one or more group-based communication feeds to client devices 110A-110N using data from the communications database 300. The communications database 300 may be embodied as a data storage device such as a Network Attached Storage (NAS) device or devices, or as a separate database server or servers. The communications database 300 includes information accessed and stored by the server 140 to facilitate the operations of the group-based communication system 100. For example, the communications database 300 may include, without limitation, a plurality of file shares and messaging communications organized among a plurality of group-based communication feeds, and/or the like.

Server 140 can communicate with one or more client devices 110A-110N via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 120 may include a cellular telephone, an 802.11, 802.16, 802.20, and/or WiMax network. Further, the communications network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The server 140 may provide for receiving of electronic data from various sources, including but not necessarily limited to the client devices 110A-110N. For example, the server 140 may be operable to receive and post or transmit group-based messaging communications and file shares provided by the client devices 110A-110N.

Client devices 110A-110N and/or server 140 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of "N" users is merely for illustration purposes. Any number of users may be included in the system 100 so long as the users have the proper credentials for accessing the selected group-based communication interface. In one embodiment, the client devices 110A-110N may be configured to display an interface on a display of the client device for viewing, creating, editing, and/or otherwise interacting with at least one group-based communication feed, which may be provided by the server 140. According to some embodiments, the server 140 may be configured to display the interface on a display of the server 140 for viewing, creating, editing, and/or otherwise interacting with a group-based communication feeds. In some embodiments, an interface of a client device 110A-110N may be different from an interface of a server 140. The client devices 110A-110N may be used in addition to or instead of the server 140. System 100 may also include additional client devices and/or servers, among other things. Additionally or alternatively, the client device 110A-110N may interact with the group-based communication system 100 via a web browser. As yet another example, the client device 110A-110N may include various hardware or firmware designed to interface with the group-based communication system 100.

The client devices 110A-110N may be any computing device as defined above. Electronic data received by the group-based communication server 106 from the client devices 110A-110N may be provided in various forms and via various methods. For example, the client devices 110A-110N may include desktop computers, laptop computers, smartphones, netbooks, tablet computers, wearables, and the like.

In embodiments where a client device 110A-110N is a mobile device, such as a smart phone or tablet, the client device 110A-110N may execute an "app" to interact with the group-based communication system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 110A-110N may interact with the group-based communication system 100 via a web browser. As yet another example, the client device 110A-110N may include various hardware or firmware designed to interface with the group-based communication system 100.

In some embodiments, a file may be shared to a group-based communication feed. When a file is shared, in some embodiments, an example message, substantially in the form of a (Secure) Hypertext Transfer Protocol ("HTTP(S)") POST message including eXtensible Markup Language ("XML") formatted data, may be provided as shown below:

```
{
  "text": "Hey everyone look at my GR8 file!",
  "ts": "1502862089.000182",
  "type": "message",
  "user": "WMIL0W4TA",
  "file": {
    // a formatted file object, notably missing initial_comment
    // and share location arrays (e.g. channels/groups/ims/users/teams)
    // since all current thread info is in the message, the file doesn't need
    // to include any of this information
  },
  "thread_ts": "1502862089.000182",
  "reply_count": 2,
  "reply_users": ["UA5APF3RG", "UPU5H4T33", "UM1L0W4TA"],
  "latest_reply": "1502862178.390182"
}
```

When a file is shared, file detail information may be generated. For instance, the file detail information may specify which group-based communication channel the file is shared in and metadata for the file share. Various other information may be included such as relevant information concerning the file itself (e.g., title, filetype, relevant URLs, etc.). The following specifically concerns information concerning the group-based communication channel the file is shared in and metadata for the file share:

```
"shares":[
"public": [
  "C1234567": [
    {
      "ts": "1501612171.098765",
      "reply_count": 13,
      "reply_users": ["UA5APF3RG", "UPU5H4T33", "UM1L0W4TA"],
      "latest_reply": "15016121732.98765",
      "thread_ts": 0
    },
    {
      "ts": "1501613252.123456",
      "reply_count": 0,
      "reply_users": [ ],
      "latest_reply": 0,
```

```
      "thread_ts": "1501312573.098765"
    }
  ]
],
"private": [
  // similar to above
]
```

In some embodiments, opening a file thread from a file share may use conversations.replies. In some embodiments, file threads may be filtered. For example, subscriptions.thread.getView API method may accept a type (e.g., file threads, public group-based communication channels, private group-based communication channels, direct messages, etc.) to filter by and return only the selected type. In some embodiments, viewing details regarding file shares may use files.info. In some embodiments of an exemplary group-based communication system, a file share or messaging communication may be sent from a client device 110A-110N to a server 140. In various implementations, the file shares/message may be sent to the group-based communication system 100 over communications network 120 directly by a client device 110A-110N, the file shares/message may be sent to the group-based communication system 100 via an intermediary such as a message server, and/or the like. For example, the client device 110A-110N may be a desktop, a laptop, a tablet, a smartphone, and/or the like that is executing a client application (e.g., a group-based communication app). In one implementation, the file shares/message may include data such as a file identifier, message identifier, sending user identifier, a group identifier, a group-based communication channel identifier, message contents (e.g., text, emojis, images, links), message hierarchy data (e.g., the message may be a reply to another message), third party metadata, and/or the like. In one embodiment, the client device 110A-110N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
```

```
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
</client_details>
<client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
</client_details>
<client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXX</client_serial_number>
        <client_UDID>FXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
</client_details>
<client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14
(KHTML, like Gecko) Version/7.0.3 Safari/537.75.14</user_agent_string>
        <client_product_type>MacPro5,1</client_product_type>
        <client_serial_number>YXXXXXXXX</client_serial_number>
        <client_UDID>FXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
</client_details>
<message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent policy.</contents>
        <attachments>patent_policy.pdf</attachments>
        </message>
</auth_request>
```

The group-based communication system 100 comprises at least one server 140 that may create a storage message based upon the received file shares/message to facilitate indexing and storage in a communication database, as will be described further below. In one implementation, the storage file shares/message may include data such as a file identifier, a message identifier, a group identifier, a group-based communication channel identifier, a sending user identifier, topics, responses, message contents, message hierarchy data, third party metadata, conversation primitive data, and/or the like. For example, the server 140 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy
    our patent policy.</contents>
```

-continued

```
<attachments>patent_policy.pdf</attachments>
<conversation_primitive>
    conversation includes messages: ID_message_8, ID_message_9,
    ID_message_10, ID_message_11, ID_message_12
</conversation_primitive>
</storage_message>
```

In embodiments, a group identifier as defined above may be associated with the file shares/message.

In embodiments, a group-based communication channel identifier as defined above may be associated with the file shares/message.

In embodiments, a sending user identifier as defined above may be associated with the file shares/message. In one implementation, the file shares/message may be parsed (e.g., using PHP commands) to determine a sending user identifier of the user who initiated the file shares/message.

In embodiments, topics may be associated with the file shares/message. In one implementation, the file shares/message contents may be parsed (e.g., using PHP commands) to determine topics discussed in the message. For example, hashtags in the file shares/message may indicate topics associated with the file shares/message. In another example, the file shares/message may be analyzed (e.g., by itself, with other file shares/message in a conversation primitive) or parsed using a machine learning technique, such as topic modeling, to determine topics associated with the file shares/message.

In one implementation, the message (e.g., introductory messaging communications) may be parsed (e.g., using PHP commands) to determine file names. File contents may be analyzed to determine context for the message (e.g., a patent policy document may indicate that the message is associated with the topic "patents").

In embodiments, data indicating responses may be associated with the file shares/message. For example, responses to the file shares/message by other users may include reactions (e.g., selection of an emoji associated with the message, selection of a "like" button associated with the file shares/message), clicking on a hyperlink embedded in the file shares/message, replying to the file shares/message (e.g., posting a message to the group-based communication channel in response to the file shares/message), downloading a file, sharing the file shares/message from one group-based communication channel to another group-based communication channel, pinning the file shares/message, starring the file shares/message, and/or the like. In one implementation, data regarding responses to the file shares/message by other users may be included with the file shares/message, and the file shares/message may be parsed (e.g., using PHP commands) to determine the responses. In another implementation, data regarding responses to the file shares/message may be retrieved from a database. For example, data regarding responses to the file shares/message may be retrieved via a MySQL database command similar to the following:

```
SELECT messageResponses
FROM MSM_Message
WHERE messageID = ID_message_10.
```

For example, data regarding responses to the file shares/message may be used to determine context for the file shares/message (e.g., a social score for the message from the perspective of some user). In another example, data regarding responses to the file shares/message may be analyzed to determine context regarding the user (e.g., the user's expertise in a topic may be determined based on the responses to the user's file shares/message regarding the topic).

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with file shares and/or messages. In one implementation, a conversation primitive is an element used to analyze, index, store, and/or the like file shares and messages. For example, the file shares/message may be analyzed by itself, and may form its own conversation primitive. In another example, the file shares/message may be analyzed along with other file shares/messages that make up a conversation, and the file shares/messages that make up the conversation may form a conversation primitive. In one implementation, the conversation primitive may be determined as the file shares/message, a specified number (e.g., two) of preceding file shares/messages and a specified number (e.g., two) of following file shares/messages. In another implementation, the conversation primitive may be determined based on analysis of topics discussed in the file shares/message and other file shares/messages (e.g., in the channel) and/or proximity (e.g., message send order proximity, message send time proximity) of these messages.

In embodiments, various metadata, determined as described above, and/or the contents of the file and/or message may be used to index the file and/or message (e.g., using the conversation primitive) to facilitate various facets of searching (i.e., search queries that return results from communication database). In one implementation, a storage message may be sent from group-based communication server 140 to facilitate indexing in the communication database. In another implementation, metadata associated with the file and/or message may be determined and the file and/or message may be indexed in the communication database. In one embodiment, the file and/or message may be indexed such that a company's or a group's files and/or messages are indexed separately (e.g., in a separate index associated with the group and/or company that is not shared with other groups and/or companies). In one implementation, files and/or messages may be indexed at a separate distributed database (e.g., to facilitate data isolation for security purposes).

For example, file contents of the files may be used to index such files in the communication database to facilitate searching. In one embodiment, the files may be indexed such that a company's or a group's files are indexed at a separate distributed database.

Figure 2:
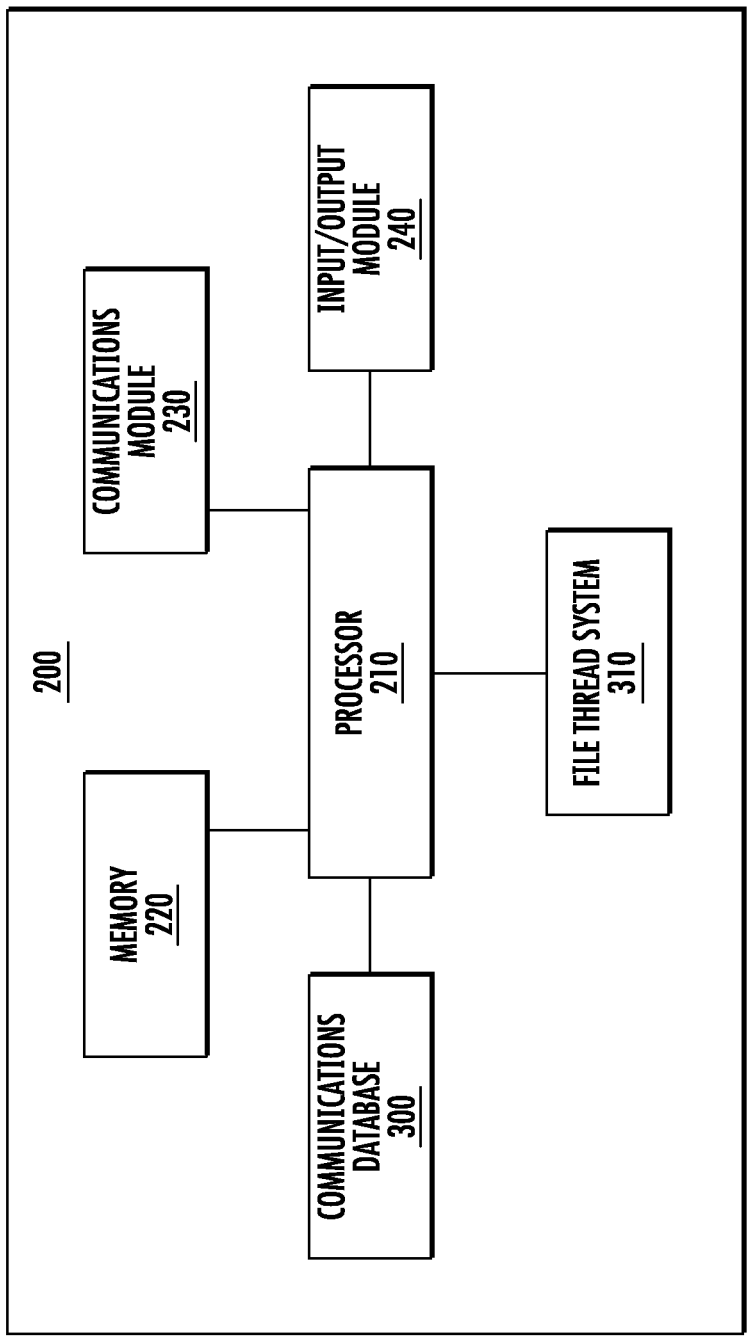
FIG. 2 illustrates a schematic block diagram of circuitry that can be included in a computing device in accordance with some embodiments discussed herein.
Figure 3A:
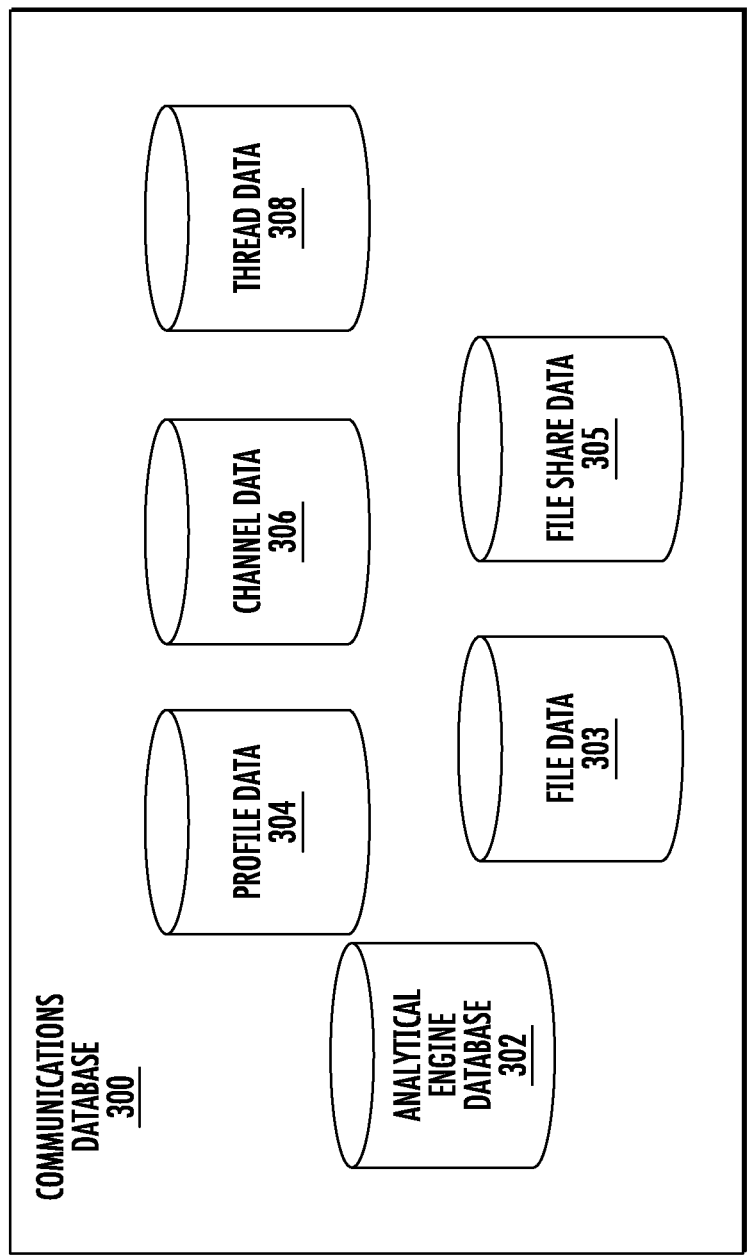
FIG. 3A illustrates an example communications database in accordance with some embodiments discussed herein.

FIG. 2 shows a schematic block diagram of circuitry 200, some or all of which may be included in, for example, server 140 and/or client devices 110A-110N. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 230, and/or input/output module 240. In some embodiments, communications database 300 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-22.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 230 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 230 (like other components discussed herein) can be at least partially embodied as or otherwise controlled by processor 210. In this regard, communications module 230 may be in communication with processor 210, such as via a bus. Communications module 230 may include, for example, an antenna, a transmitter, a receiver, a transceiver, network interface card and/or supporting hardware and/or firmware/software for enabling communications with another computing device. Communications module 230 may be configured to receive and/or transmit any data that may be stored by memory 220 using any protocol that may be used for communications between computing devices. Communications module 230 may additionally or alternatively be in communication with the memory 220, input/output module 240 and/or any other component of circuitry 200, such as via a bus.

Input/output module 240 may be in communication with processor 210 to receive an indication of a user input and/or to provide an audible, visual, mechanical, or other output to a user (e.g., provider and/or consumer). Some example visual outputs that may be provided to a user by circuitry 200 are discussed in connection with FIGS. 1-14. As such, input/output module 240 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 240 may be reduced as compared to embodiments where circuitry 200 is implemented as an end-user machine (e.g., consumer device and/or provider device) or other type of device designed for complex user interactions. In some embodiments (like other components discussed herein), input/output module 240 may even be eliminated from circuitry 200. Alternatively, such as in embodiments wherein circuitry 200 is embodied as a server or database, at least some aspects of input/output module 240 may be embodied on an apparatus used by a user that is in communication with circuitry 200. Input/output module 240 may be in communication with the memory 220, communications module 230, and/or any other component(s), such as via a bus. One or more than one input/output module and/or other component can be included in circuitry 200.

Communications database 300 and file thread system 310 may also or instead be included and configured to perform the functionality discussed herein related to storing, generating, and/or editing communications data. In some embodiments, some or all of the functionality of generating and/or editing group-based communication feeds and/or profile data may be performed by processor 210. In this regard, the example processes and algorithms discussed herein can be performed by at least one processor 210, communications database 300, and/or file thread system 310. For example, non-transitory computer readable media can be configured to store firmware, one or more application programs, and/or other software, which include instructions and other computer-readable program code portions that can be executed to control each processor (e.g., processor 210, communications database 300, and file thread system 310) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

In some embodiments, a communications database 300 may be provided that includes channel data 306, profile data 304, thread data 308, file data 303, file share data 305, and/or analytical engine data 302. Channel data 306 may include various information, such as messaging communication information, related to group-based communication channels. Thread data 308 may include various information, such as messaging communication information, related to threads. Profile data 304, in some embodiments, may include biographical data and/or preference data associated with individual profiles or group profiles. File data 303 may include various information related to files, such as title, user who originally uploaded file, additional users who uploaded the file, time of uploads, size of file, changes made to file, and any other information to characterize a file. File share data 305 may include various information related to sharing a file, such as introductory messages, users who shared the file, time of share, location of sharing, other titles the file was shared under, changes made to the file share (e.g., changes made to the introductory message) and any other information to characterize the file share. Additionally or alternatively, the communications database 300 may include analytical engine data 302 which provides any additional information needed by the processor 210 in computing file shares, messaging communications, indications, notifications, and requests.

File thread system 310 can be configured to analyze multiple sets of requests, indications, identifiers, and messaging communications, such as the data in the communications database 300. In this way, file thread system 310 may support multiple algorithms, including those discussed below with respect to files, group-based communication channels, group-based messaging communications, threads, and thread communication messages, etc., so that the selected algorithm may be chosen at runtime. Further, the present configuration can enable flexibility in terms of configuring additional contexts.

Figure 3B:
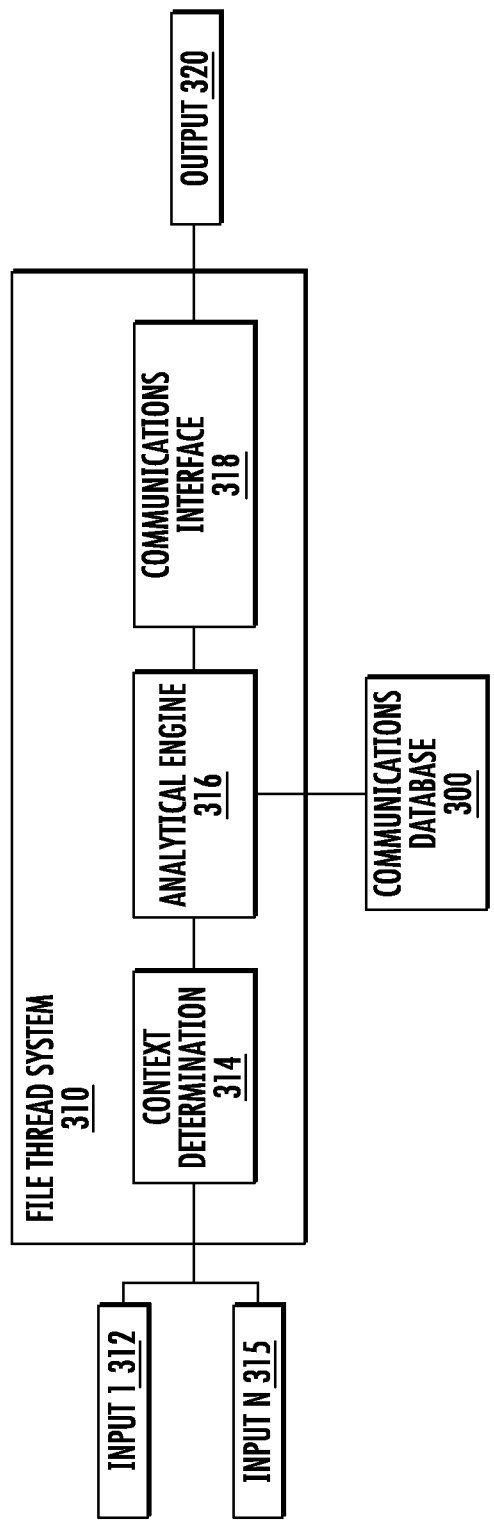
FIG. 3B illustrates an example file thread system in accordance with some embodiments discussed herein.

In some embodiments, with reference to FIG. 3B, the file thread system 310 may include a context determination module 314, an analytical engine 316, and communications interface 318, all of which may be in communication with the communications database 300. The file thread system 310 may receive one or more messaging communications, requests, and indications and may generate the appropriate notifications, indications, messaging communications (e.g., channel-based, thread-based, direct message-based, etc.), avatars, and/or display panes with the appropriate communication feeds (e.g., group-based communication channels, threads, direct messages, etc.) in response. The file thread system 310 may use any of the algorithms or processes disclosed herein for receiving a request, messaging communications, and indications, and generating the appropriate notifications, avatars, indications, messaging communications (e.g., group-based communication channels, threads, direct messages, etc.), and/or display panes with the appropriate communication feeds (e.g., group-based communication channels, threads, direct messages, etc.) in response. In some other embodiments, such as when the circuitry 200 is embodied in a server 140 and/or client devices 110A-110N, the file thread system 310 may be located in another circuitry 200 or another device, such as another server 140 and/or client devices 110A-110N.

The file thread system 310 can be configured to access data corresponding to multiple group-based communication channels, threads, direct messages, etc. and generate one or more appropriate notifications, indications, messaging communications (e.g., group-based communication channels, threads, direct messages, etc.), and/or display panes with the appropriate communication feeds (e.g., group-based communication channels, threads, direct messages, etc.) in response.

The system may receive a plurality of inputs 312, 315 from the circuitry 200 and process the inputs within the file thread system 310 to produce an output 320, which may include appropriate notifications, indications, messaging communications, and/or display panes with the appropriate group-based communication feeds in response. In some embodiments, the file thread system 310 may execute context determination using the context determination module 314, process the data in an analytical engine 316, and output the results via a communications interface 318. Each of these steps may pull data from a plurality of sources including the communications database 300.

When inputs 312, 315 are received by the file thread system 310, a context determination using the context determination module 314 may be made. A context determination includes such information as a user or group preference data, when and what user initiated receipt of the input (e.g., when and who selected the actuator that initiated the request), what type of input was provided (e.g., was a file share request initiated, was a broadcast request initiated, or a file thread request initiated) and under what circumstances was receipt of the input initiated (e.g., in what display pane was the input initiated, in what group-based communication feed was the input initiated, etc.). This information may give context to the file thread system 310 analysis to determine the output. For example, the context determination module 314 may inform the file thread system 310 as to the messaging communication information to output with a thread communication message or group-based messaging communication.

The file thread system 310 may then compute the output using the analytical engine 316. The analytical engine 316 draws information about the applicable channel communication data, profile data, and thread communication data, etc. from the communications database 300 and then, in light of the context determination module's 314 determination, computes an output, which varies based on the input. The communications interface 318 then outputs 320 the output to the circuitry 200 for displaying on the selected group-based communication interface. For instance, the context determination module 314 may determine that a file thread request was received in a selected group-based communication channel by a certain user. The file thread request may include a file identifier and a specified group-based communication feed identifier. In some embodiments, the file thread request may include a file identifier, a specified group-based communication feed identifier, and a thread messaging communication. Based on this information as well as the applicable channel communication data, profile data, and file data, etc., the analytical engine 316 may determine an appropriate output, such as presenting a communication message along with a thread file summary avatar in a subsidiary group-based communication feed, such as in a thread messaging pane. The analytical engine 316 may also determine that certain thread summary indications should be updated to reflect the new thread communication message. Similarly, the context determination module 314 may determine that a file share request, follow request, an unfollow request, profile identifier, selected channel view request, search request, thread summary view request, etc. was received as well as any additional contextual information and the analytical engine 316 would determine the appropriate output based on this information as well as additional information from the communications database 300 as further described herein.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, communications database 300, and/or file thread system 310 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 4A:
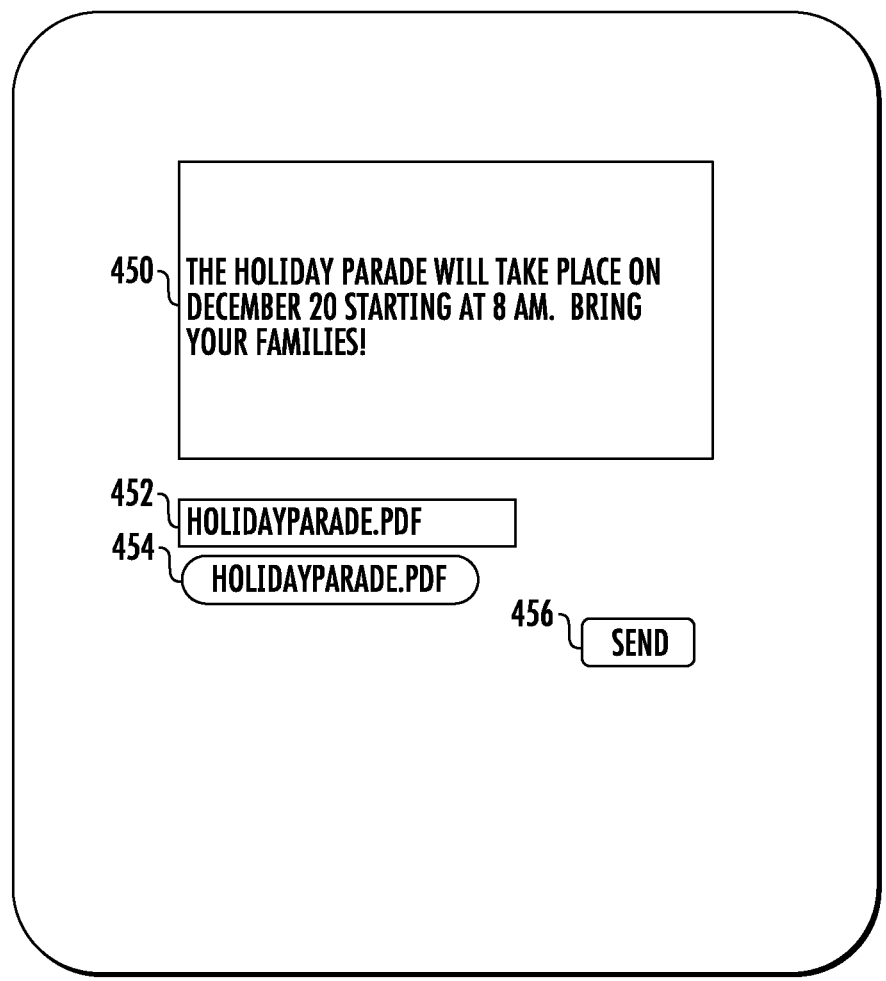
FIG. 4a illustrates an example group-based communication interface in receipt of a file share request in accordance with some embodiments discussed herein.

FIG. 4a illustrates an example group-based communication interface where a file is shared to the interface. The depicted group-based communication interface includes an introductory messaging communication input register 450, a file indicator 454, a title input register 452, and a file share actuator 456, which initiates the sharing of the associated file. In some embodiments, the resulting file summary avatar created for the file share request along with the introductory messaging communication are generated and displayed in the associated group-based communication feed. For instance, FIG. 4a may be located in a group-based communication channel, thread, or direct message. The file summary avatar and introductory messaging communication are displayed in the associated group-based communication channel, thread, or direct message.

Figure 10:
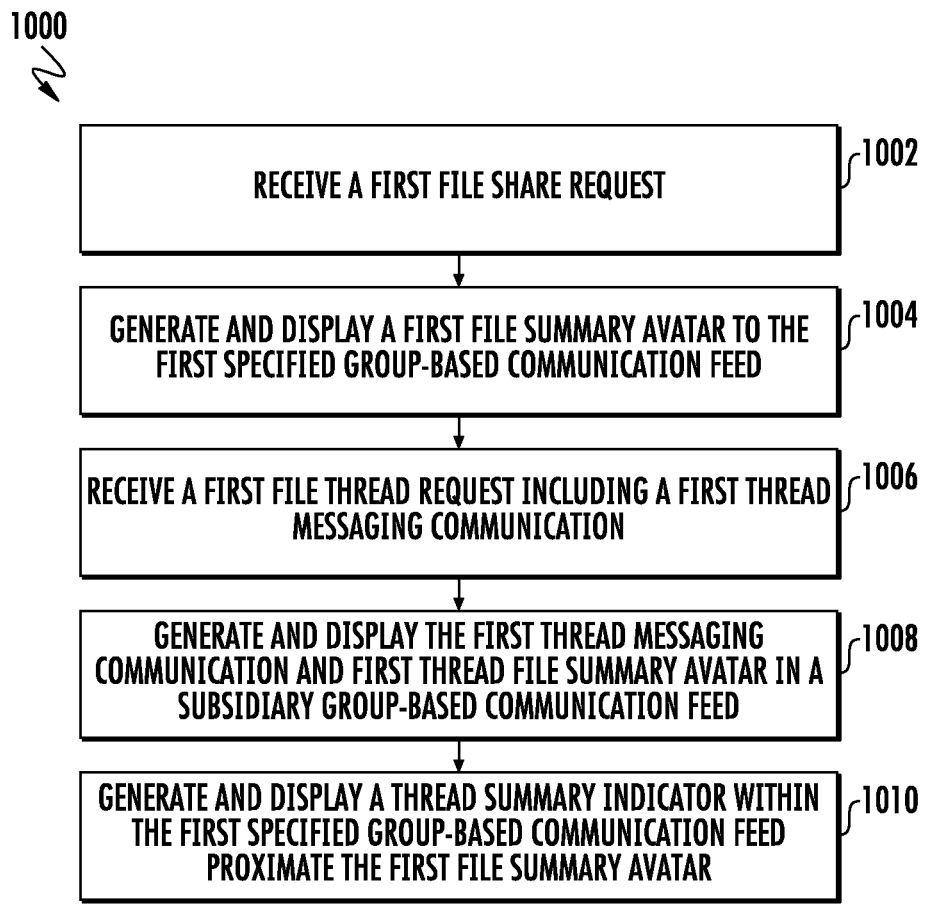
FIG. 10 illustrates a flow diagram of an example system in accordance with some embodiments discussed herein.

FIG. 10 illustrates a flow diagram of an example system in accordance with some embodiments discussed herein. The method 1000 illustrated in FIG. 10 includes receiving a first file share request 1002, generating and displaying a first file summary avatar to the first specified group-based communication feed 1004, receiving a first file thread request including a first thread messaging communication 1006, generating and displaying the first thread messaging communication and first thread file summary avatar in a subsidiary group-based communication feed 1008, and generating and displaying a thread summary indicator within the first specified group-based communication feed proximate the first file summary avatar 1010.

Figure 4B:
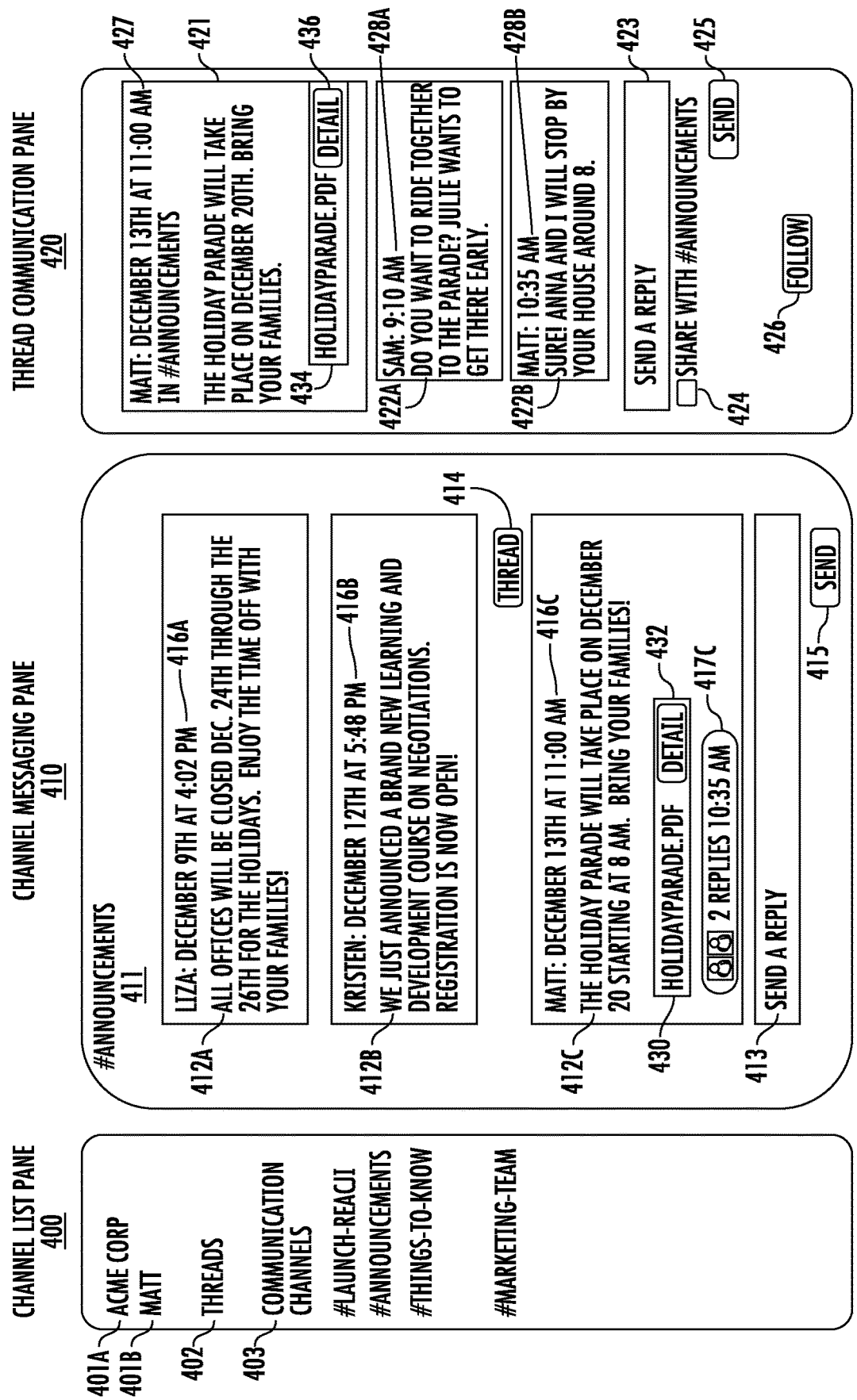
FIG. 4b illustrates an example group-based communication interface after receipt of a file thread request in accordance with some embodiments discussed herein.

FIG. 4b illustrates the display of the file summary avatar 430 and introductory messaging communication 412c in a group-based communication channel and thread. Messaging communication information 416c is included with the introductory messaging communication 412c and the file summary avatar 430, as well as the file detail actuator 432 and thread summary indicator 417c. In the embodiment illustrated in FIG. 4b, the messaging communication information 416c includes a profile identifier and the time and date of receipt of the respective group-based messaging communication. Various information can be included in the messaging communication information 416c.

FIG. 4b illustrates an example group-based communication interface having a channel list pane, channel messaging pane, and thread communication pane in accordance with some embodiments discussed herein. The depicted group-based communication interface presents channel list pane 400, channel messaging pane 410, and thread communication pane 420. The channel list pane 400 includes a thread indication 402, communication channel indications 403 (e.g., identifying channels that the member follows), the name of the group 401A ("ACME Corp"), and the name of the particular member 401B ("Matt") viewing the interface. As shown in FIG. 4b, the selected group-based communication interface may be configured to display the channel list pane, channel messaging pane, and thread communication pane simultaneously.

The channel messaging pane 410 includes a selected group-based communication channel 411 ("announcements") which includes a feed of group-based messaging communications 412A-412B. Each group-based messaging communication 412A-412B includes messaging communication information 416A-416B. The messaging communication information 416A-416B includes a profile identifier and the time and date of receipt of the respective group-based messaging communication. The channel messaging pane 410 may include other identifying information for the group-based communication channel (e.g., date of creation, time of last messaging communication, members of communication channel, etc.).

As shown in FIG. 4b, the channel messaging pane 410 also includes a channel communication input register 413 and a channel messaging actuator 415. The channel communication input register 413 is configured to receive group-based messaging communications from a member to be displayed in the selected group-based communication channel displayed in the channel messaging pane 410. The channel messaging actuator 415 (e.g., a button) can be selected by a member and initiates transmission of the group-based messaging communication inserted into the channel communication input register 413 to the circuitry 200 for processing. The group-based messaging communication is then displayed in the channel messaging pane 410.

As also shown in FIG. 4b, the channel messaging pane 410 includes a file thread actuator 414. The file thread actuator 414 is configured to initiate a file thread request to create a thread in the thread communication pane 420. The file thread actuator 414 shown in FIG. 4b is associated with the introductory messaging communication 412C. Each group-based messaging communication of a group-based communication channel may have a thread actuator associated with the communication. Thus, threads can be created from any group-based messaging communication of a group-based communication channel in a channel messaging pane. In the embodiment illustrated in FIG. 4b, the file thread actuator 414 is displayed when a member touches or moves a cursor over the introductory messaging communication 412C. The file thread actuator 414 can be selected to create a conversation off of the file share. The conversation will be presented in the thread communication pane 420. In the embodiment illustrated in FIG. 4b, a file thread has been created from the introductory messaging communication 412C (as shown for instance by the thread summary indicator 417C) that is displayed in the thread communication pane 420. The file thread was initiated by a member selecting the file thread actuator 414, which initiated a file thread request. Should the member select the file thread actuator 414 a second time, the file thread would simply appear in the thread communication pane 420. Additional thread communication messages can be received using the respective thread communication input register 423 and thread messaging actuator 425.

Subsequent file shares may include respective file thread actuators, which upon selection create another file thread. For instance, a second file thread could be created from a second file share including an introductory messaging communication and file summary avatar by selecting the respective file thread actuator, initiating a file thread request. In response to a second file thread request, the second file thread would be displayed in the thread communication pane 420 instead of the file thread shown in FIG. 4b. The second file thread would include a second thread summary avatar, second thread-based introductory messaging communication, and messaging communication associated with the second file thread request.

In the embodiment illustrated in FIG. 4b, the thread summary indicator 417C includes the number of messaging communications received in the respective thread ("2 Replies") (i.e., the thread count), a profile identifier (e.g., avatar) associated with the member who submitted the thread communication message(s), and include a latency indicator ("10:35 AM") that indicates the time of receipt for the latest thread communication message in the thread. Such information can be beneficial to members of the group-based communication channel in determining whether to access and view the thread. A variety of information can be displayed in the thread summary indicators.

The thread summary indicator 417C can be configured as a selected thread view actuator to initiate a selected thread view request (e.g., a file thread view request). The selected group-based communication interface is configured to receive selected thread view requests and in response to receipt of selected thread view requests, present a thread communication pane (e.g., thread communication pane 420) displaying the selected thread associated with the selected thread view request. For instance, in the embodiment illustrated in FIG. 4b, thread summary indicator 417C is configured as a selected file thread view actuator to initiate a selected file thread view request upon selection by a member to view the full file thread stemming from the introductory messaging communication 412C and file summary avatar 430 associated with the thread summary indicator 417C, as is shown in the thread communication pane 420.

Figure 14:
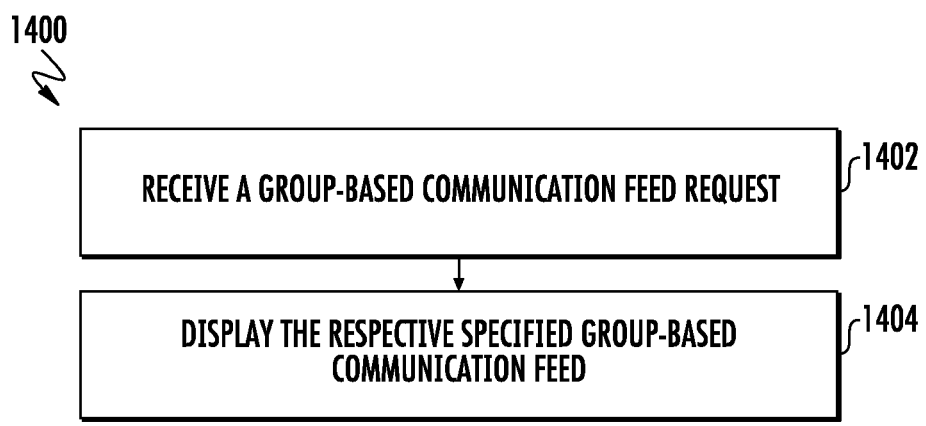
FIG. 14 illustrates a flow diagram of an example system in accordance with some embodiments discussed herein.

FIG. 14 illustrates a flow diagram of an example system in accordance with some embodiments discussed herein. The method 1400 illustrated in FIG. 14 includes receiving a group-based communication feed request 1402 and displaying the respective specified group-based communication feed 1404. In some embodiments, the group-based communication feed request may be a selected channel view request, selected thread view request (e.g., file thread view request), or a direct message view request.

The thread communication pane 420 includes thread-based introductory messaging communication 421 and thread file summary avatar 434 associated with the introductory messaging communication 412C of the group-based communication channel from which the displayed thread was created. The thread communication pane 420 also includes thread communication messages 422A-422B. Each of the thread communication messages 422A-422B and the thread-based introductory messaging communication 421 includes messaging communication information 427 and 428A-428B. The messaging communication information 427 and 428A-428B includes a profile identifier and the time and/or date of receipt of the respective messaging communication. The messaging communication information 427 also includes the name of the group-based communication channel from which the thread was created (e.g., "announcements"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 4*b*, selection of the name of the group-based communication channel (i.e., "announcements") from which the thread was created can be configured as a selected channel view actuator to initiate a selected channel view request to view the "announcements" channel, as is shown in the channel messaging pane 410. Various configurations of selected channel view actuator can be used to initiate selected channel view requests from the thread communication pane 420.

The thread communication pane 420 also includes a thread communication input register 423, a broadcast actuator 424, a thread messaging actuator 425, and a follow/unfollow actuator 426. The thread communication input register 423 is configured to receive thread communication messages from a member. The thread messaging actuator 425 (e.g., a button) can be selected by a member and initiates transmission of the thread communication message inserted into the thread communication input register 423 to the circuitry 200 for processing. In some embodiments, the thread messaging actuator 425 may be hidden until a member enters information in the thread communication input register 423. The thread messaging actuator 425 may then be displayed and selected by a member. The thread communication message is then displayed in the thread communication pane 420.

The follow/unfollow actuator 426 in the thread communication pane 420 is selectable by a member of the group-based communication channel from which the thread was created and initiates a request to either follow the respective thread or unfollow the respective thread. The selected group-based communication interface is configured such that a file thread request (i.e., requesting the creation of a thread from a file) initiates a follow request associated with the member who shared the file from which the thread was created and the member who initiated the file thread request. Other members of the selected group-based communication channel from which the thread was created can follow the thread by selecting the follow/unfollow actuator 426. In other embodiments, as will be discussed in relation to FIG. 5 for instance, a profile identifier can be configured to initiate a follow request for the member associated with the profile identifier.

Figure 7:
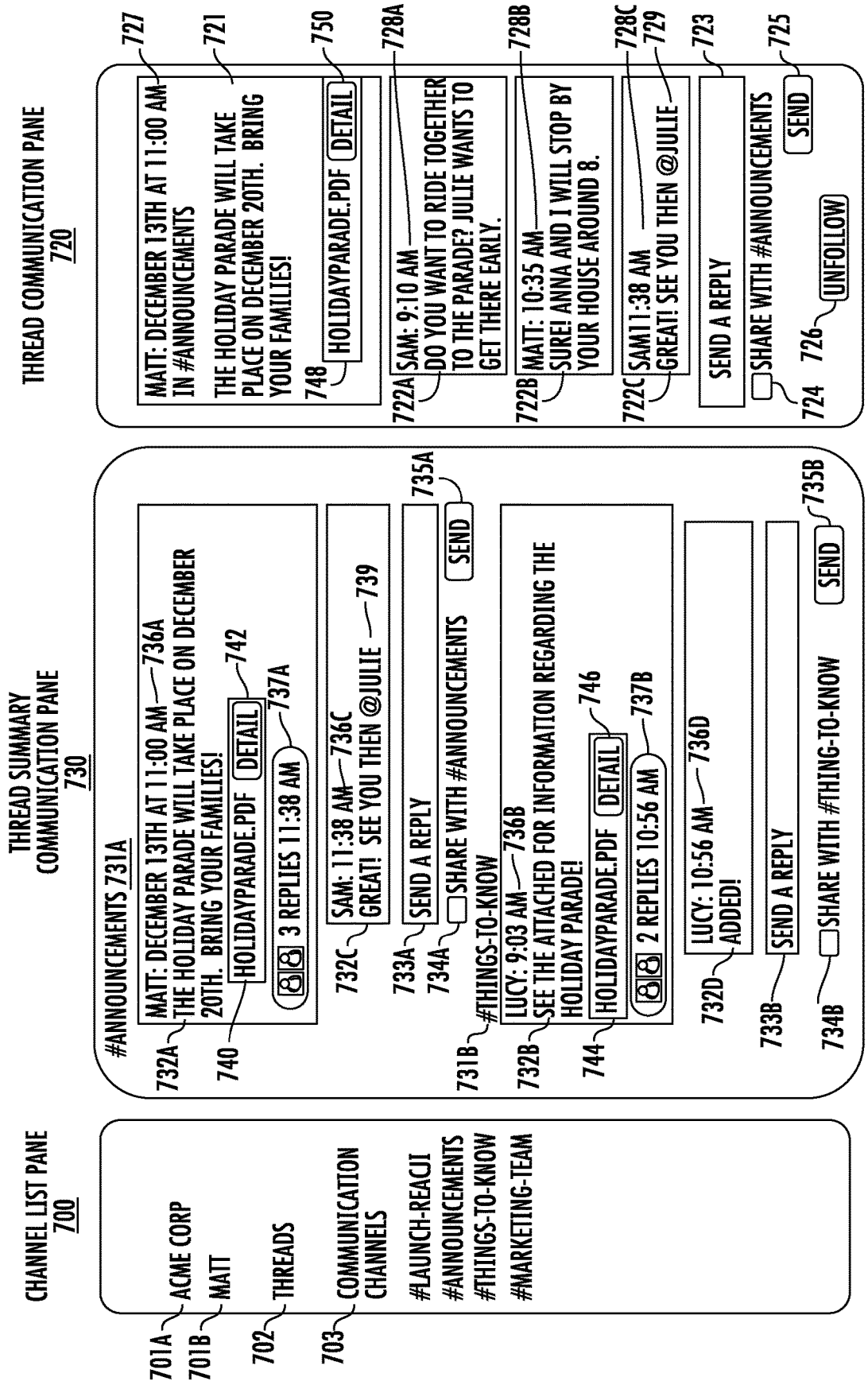
FIG. 7 illustrates an example group-based communication interface having a channel list pane, a thread summary communication pane, and a thread communication pane in accordance with some embodiments discussed herein.

The group-based communication interface will present a thread indication (e.g., thread indication 402) in the channel list pane. In response to a follow request, the thread indication 402 is configured to indicate that the follow request was received. The group-based communication interface will update the thread summary communication pane to include the respective thread. The group-based communication interface will highlight the thread indication if new thread communication messages are received in the followed thread. The follow/unfollow actuator 426 may also be modified to display "unfollow" (e.g., as shown in FIG. 7) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 426 may also be modified to display "follow" in response to receiving the follow request (e.g., as shown in FIG. 4*b*).

Figure 22:
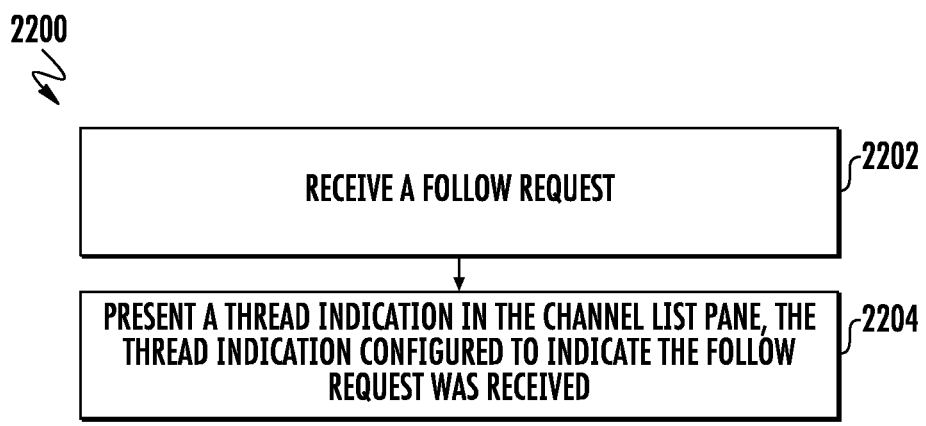
FIG. 22 illustrates a flow diagram of an example system in accordance with some embodiments discussed herein.

FIG. 22 illustrates a flow diagram of an example system in accordance with some embodiments discussed herein. In particular, FIG. 22 illustrates a method 2200 involving the receipt of a follow request. The method 2200 includes receiving a follow request 2202, and presenting a thread indication in the channel list pane, the thread indication configured to indicate that the follow request was received 2204.

While not illustrated, the group-based communication interface is configured to allow a member to search for specific files using a search actuator initiating a search request. In response to a search request, the group-based communication interface will display applicable group-based communication channels, threads, and/or direct messages, in which the file was shared. The group-based communication channels, threads, and/or direct messages can then be viewed in full by selecting a selected channel view actuator, selected thread view actuator, or a selected direct message actuator initiating the respective view request. The selected group-based communication channel may be displayed in a channel communication pane while a thread may be displayed in a thread communication pane.

In some embodiments, the group-based communication interface may allow for viewing each instance that a file has been shared (that is, each file share associated with a single file). For instance, in some embodiments, a file detail view may be available to list each location in which a file is shared and provide details regarding each file share. The file detail view may be provided in a detail pane, e.g., the detail pane 910 of FIG. 9. As shown in FIG. 4*b*, a file detail actuator 432, 436 may be displayed proximate to the respective file summary avatar. The file detail actuator 432, 436 may be configured to generate and transmit a file detail request. The file detail request may result in the generation and display of a file detail view, as shown for example in FIG. 9, which includes file detail information. The file detail information a file detail identifier 920, file detail avatar 940, group-based communication feed identifiers 942, 944, 946, the latter of which may be configured to be actuators actuating select group-based communication feed requests. In the embodiment illustrated in FIG. 9, the file shares are listed. The file shares may be further organized by type (e.g., group-based communication channel, direct message, thread, etc.), by privacing coding (e.g., private group-based communication feed), or any other method of organizing the file shares. The file detail view also includes feed summary indicators 943, 945 that include the number of messaging communications received in the respective group-based communication feed (e.g., "3 Replies" or "2 Replies") (i.e., the message count), a profile identifier (e.g., avatar) for each member who submitted messaging communications(s), and includes a latency indicator (e.g., "11:38 AM" or "10:56 AM") that indicates the time of receipt for the latest messaging communication in the respective group-based communication feed.

Figure 13:
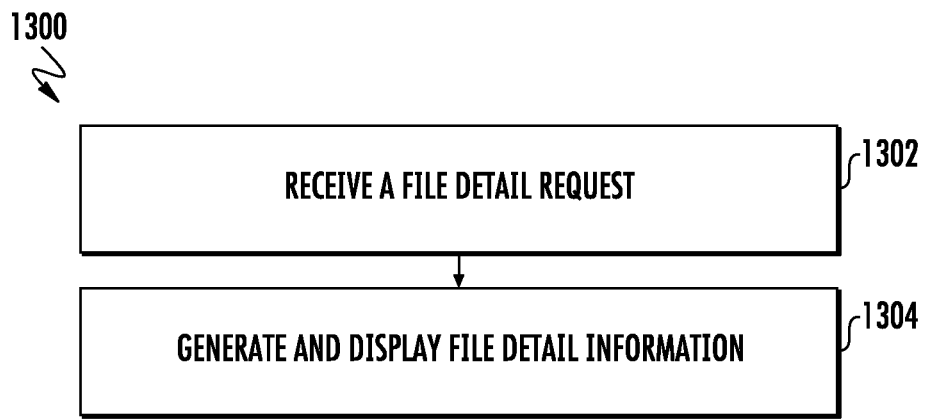
FIG. 13 illustrates a flow diagram of an example system in accordance with some embodiments discussed herein.

FIG. 13 illustrates a flow diagram of an example system in accordance with some embodiments discussed herein. In particular, FIG. 13 illustrates an exemplary method of requesting to view a file detail view. The method 1300 illustrated in FIG. 13 includes receiving a file detail request 1302 and generating and displaying file detail information 1304.

Figure 11:
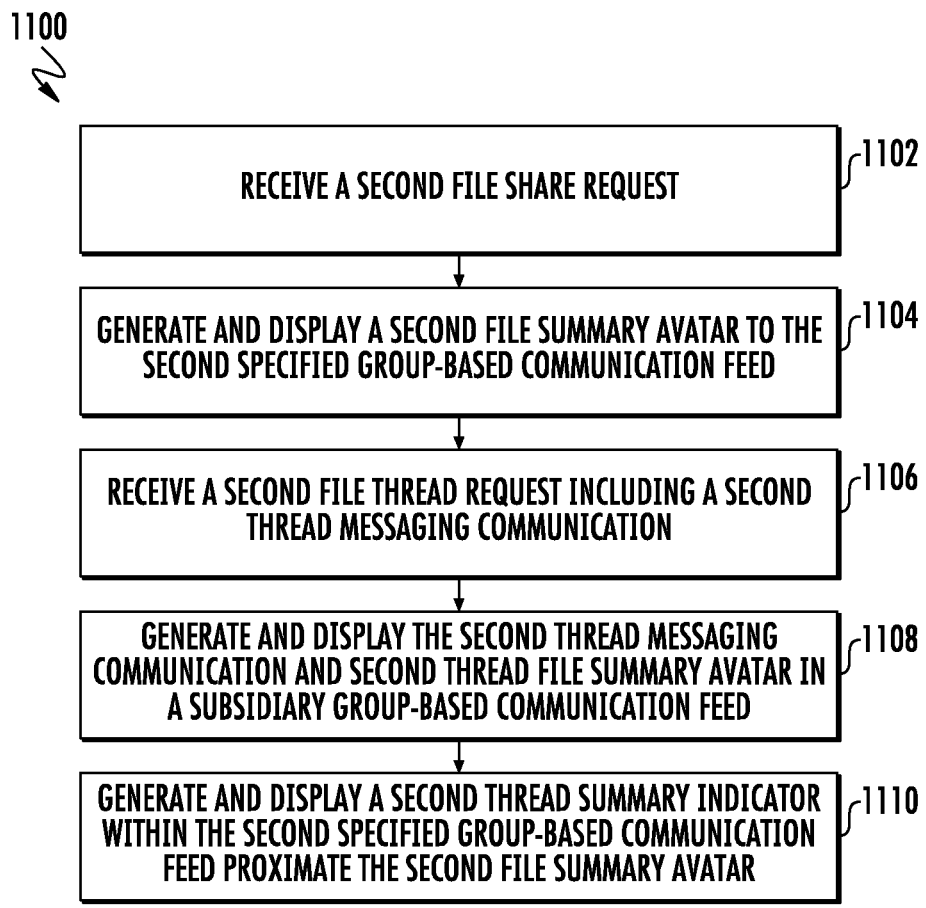
FIG. 11 illustrates a flow diagram of an example system in accordance with some embodiments discussed herein.

In some embodiments, a second file share request may be received, where the second file request is configured to request another instance of sharing the file. FIG. 11 illustrates a flow diagram of an example system in accordance with some embodiments discussed herein, in particular, where a file is requested to be shared a second time (that is, in a group-based communication feed different from the first file share and/or at a time different from the first file share). The method 1100 illustrated in FIG. 11 includes receiving a second file share request 1102, generating and displaying a second file summary avatar to the second specified group-based communication feed 1104, receiving a second file thread request including a second thread messaging communication 1106, generating and displaying the second thread messaging communication and a second thread file summary avatar in a subsidiary group-based communication feed 1108, and generating and displaying a thread summary indicator within the second specified group-based communication feed proximate the second file summary avatar 1110. With each subsequent sharing of a file, a new file summary avatar is created and a new introductory messaging communication may be added with the file summary avatar.

Figure 5:
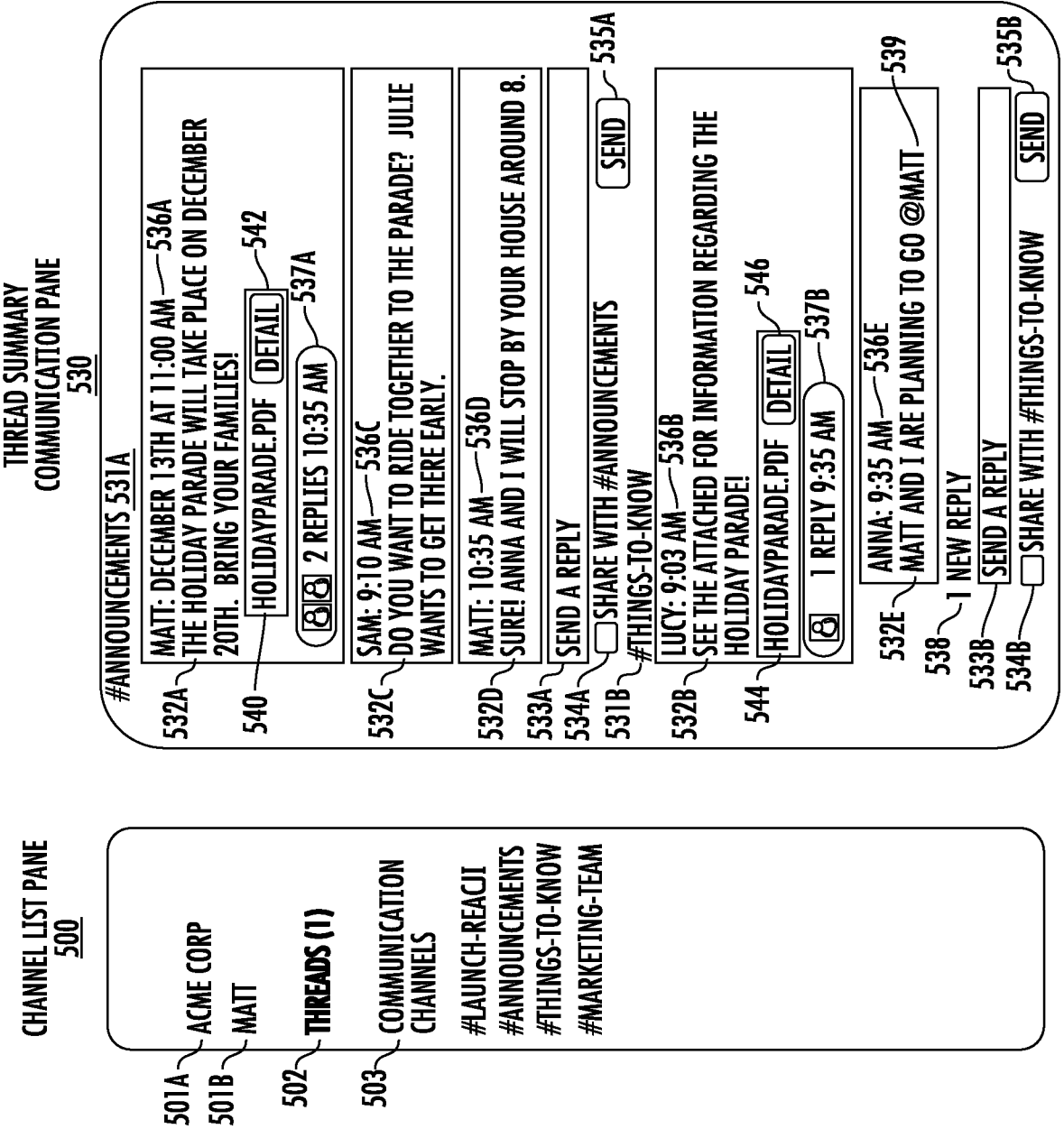
FIG. 5 illustrates an example group-based communication interface having a channel list pane and a thread summary communication pane in accordance with some embodiments discussed herein.

FIG. 5 illustrates multiple file shares. In particular, FIG. 5 illustrates the thread summary communication pane showing two file threads. FIG. 5 illustrates the sharing of "HolidayParade.pdf" in two different group-based communication channels (e.g., # announcements and # things-to-know). As shown in FIG. 5, each instance of sharing (that is, each file share request) initiates a new file thread and thus a separate conversation. The introductory messaging communications are unique to the file share request, and the subsequent messaging communications received in each thread are unique to the respective thread and file share request.

FIG. 5 illustrates the display of the file summaries including file summary avatars 540, 544 and respective introductory messaging communications 532A, 532B. Messaging communication information 536a, 536b is included with the introductory messaging communications 532A, 532B and the file summary avatars 540, 544, as well as file detail actuators 542, 546 and thread summary indicators 537a, 537b. In the embodiment illustrated in FIG. 5, the messaging communication information 536a, 536b includes a profile identifier and the time and date of receipt of the respective group-based messaging communication. Various information can be included in the messaging communication information 536a, 536b.

In some embodiments, the selected group-based communication interface is configured to receive thread summary view requests in a thread summary communication pane. The member of the selected group-based communication interface can thereby view a summary of the threads that the member follows including file summary avatars and respective introductory messaging communication in the thread summary communication pane. For instance, FIG. 5 illustrates an example group-based communication interface having a channel list pane and a thread summary communication pane in accordance with some embodiments discussed herein. The channel list pane 500 includes a thread indication 502, communication channel indications 503 (e.g., identifying channels that the member follows), the name of the group 501A ("ACME Corp"), and the name of the particular member 501B ("Matt") viewing the interface.

Figure 20:
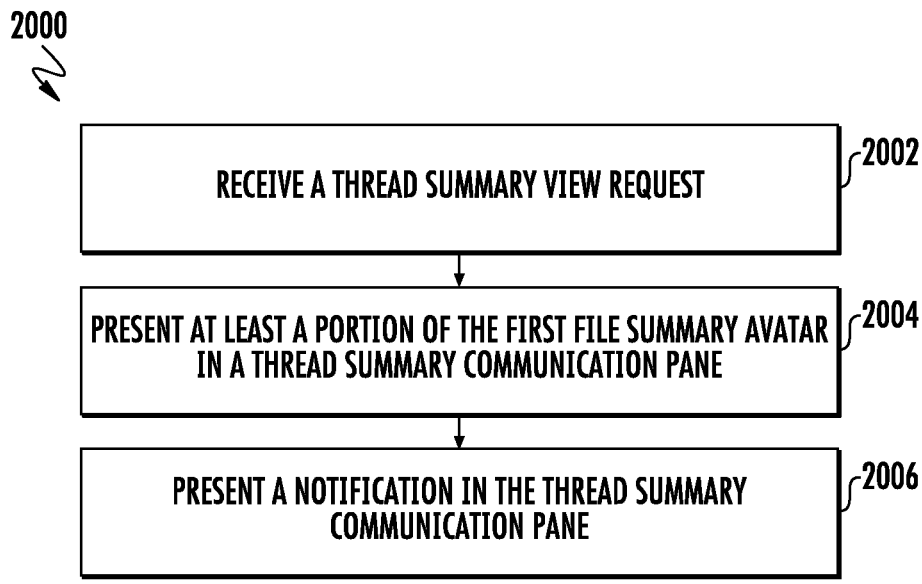
FIG. 20 illustrates a flow diagram of an example system in accordance with some embodiments discussed herein.

In some embodiments, the thread indication 502 may be configured as a thread summary view actuator to initiate a thread summary view request. FIG. 20 illustrates a flow diagram of an example system in accordance with some embodiments discussed herein. The method 2000 illustrated in FIG. 20 involves the receipt of a thread summary view request and the subsequent display of a summary of the threads and/or notifications regarding the threads. Method 2000 is particular to threads created from file shares. In particular, the method 2000 includes receiving a thread summary view request 2002 and presenting at least a portion of the first file summary avatar in a thread summary communication pane 2004. At least a portion of an introductory messaging communication associated with the file summary avatar may also be displayed. The method 2000 may also include presenting a notification in the thread summary communication pane 2006, though this is optional and may depend on whether a new thread communication message has been received for the member's attention.

The selected group-based communication interface is configured to receive a thread summary view request and in response to receipt of the thread summary view request, present a thread summary communication pane 530 displaying a summary of each thread that the member follows. For instance, in the embodiment illustrated in FIG. 5, selection of the thread indication 502 (i.e., "Threads (1)") can be configured as a thread summary view actuator to initiate a thread summary view request to view a summary of each thread that the member ("Matt") follows, as is shown in the thread summary communication pane 530. Various configurations of thread summary view actuators can be used to initiate thread summary view requests from the channel list pane 500.

In the embodiment illustrated in FIG. 5, the thread indication 502 is bolded and includes "(1)" to indicate that a new thread communication message for the member's attention has been received. The thread indication 502 can be highlighted or marked in various ways to draw the member's attention to the thread. Once the new thread communication message is displayed by the selected group-based communication interface to the member, the bolded font or "(1)" may be removed.

The thread summary communication pane 530 displays a summary of the threads that the member follows including file threads. As shown in FIG. 5, for each thread summary, the thread summary communication pane 530 includes the name of the group-based communication channel from which the thread was created 531A-531B, the selected group-based messaging communication (e.g., the introductory messaging communication) 532A-532B and/or file summary avatar 540, 544 from which the thread was created, and thread communication messages received in the thread 532C-532E. For each thread summary, the thread summary communication pane 530 also includes a thread communication input register 533A-533B, a broadcast actuator 534A-534B, and a thread messaging actuator 535A-535B. The thread communication input registers 533A-533B are configured to receive thread communication messages from a member. The thread messaging actuators 535A-535B (e.g., buttons) can be selected by a member and initiate transmission of the respective thread communication message inserted into the thread communication input register 533A-533B to the circuitry 200 for processing. The thread communication message is then displayed in the thread summary communication pane 530.

In the embodiment illustrated in FIG. 5, the thread summary communication pane 530 displays a summary of a thread from the "announcements" group-based communication channel and a summary of a thread from the "things-to-know" group-based communication channel. Each of the selected group-based messaging communication (e.g., the introductory messaging communication) 532A-532B and/or file summary avatar 540, 544 from which the thread was created and the thread communication messages received in the thread 532C-532E include messaging communication information 536A-536E. The messaging communication information 536A-536E includes a profile identifier and the time and/or date of receipt of the respective group-based messaging communication or thread communication message. The thread summary communication pane 530 may include other identifying information for each thread (e.g., members of communication channel, etc.). Each of the selected group-based messaging communication (e.g., the introductory messaging communication) 532A-532B and/or file summary avatar 540, 544 from which the thread was created includes a thread summary indicator 537A and 537B. In the embodiment illustrated in FIG. 5, the thread summary indicators 537A and 537B include the number of thread communication messages received in the thread (e.g., "2 Replies" or "1 Reply") (i.e., the thread count), a profile identifier (e.g., avatar) for each member who submitted thread communication message(s), and includes a latency indicator (e.g., "10:35 AM" or "9:35 AM") that indicates the time of receipt for the latest thread communication message in the respective thread. In this embodiment, the threads are ordered in reverse chronological order, displaying the thread with the most recent thread communication message first. The threads may be organized in a variety of manners in the thread summary communication pane 530. A variety of information can be displayed in the thread summary indicators.

As files are shared and file threads are created, the selected group-based communication interface may present notifications regarding the receipt of thread communication messages. The notifications may appear in a specified display pane, which may appear when necessary or may always be present. For instance, a display pane may be presented to notify a user that a new thread communication message was received and may then be removed after a specified period of time. The notification in the display pane may be selected to initiate a request (e.g., to view the specific file thread (file thread view request), view the specific thread (selected thread view request), or view a summary of the new threads (thread summary view request)). Various forms of notifications may be presented to notify the user (via the client device) of the new thread communication message and may be configured as actuators to allow the user to initiate desired requests.

In the embodiment illustrated in FIG. 5, notification 538 is displayed in the thread summary communication pane 530. The notification 538 includes the number of new thread communication messages ("1 New Reply") and is associated with the thread in which the new thread communication message was received. The notification 538 can include any desired information regarding the receipt of new thread communication messages (e.g., date and time of new thread communication messages, profile identifier of member who submitted thread communication message, etc.). The notification 538 in the embodiment illustrated in FIG. 5 is configured as a thread reply view actuator that is configured to initiate a thread reply view request. The selected group-based communication interface is configured to receive thread reply view requests and in response, display the selected thread communication message associated with the thread reply view request. For instance, if a member were to select the notification 538 in FIG. 5, the selected group-based communication interface would, in response, display the selected thread communication message associated with the notification in place of the notification 538. The member could thereby view the selected thread communication message in the thread summary communication pane 530.

Additional notifications may be displayed in the thread summary communication pane 530, such as banners configured to indicate a variety of information (e.g., number of new thread communication messages received, time of last receipt, time of last display of thread summary communication pane). Further, in some embodiments, the selected group-based communication interface may be configured to display a banner separating new threads from already displayed threads. The thread summary communication pane 530 can also be refreshed by a member (e.g., by selecting a thread summary view actuator to initiate a thread summary view request) initiating the display of different notifications updated to indicate the latest information.

As noted above, the thread summary communication pane 530 includes the name of the group-based communication channel from which each thread was created (e.g., "announcements" and "things-to-know"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 5, selection of the name of the group-based communication channel (e.g., "announcements") from which the first thread was created can be configured as a selected channel view actuator to initiate a selected channel view request to view the "announcements" channel (e.g., as shown in FIG. 4b in the channel messaging pane 410). Various configurations of selected channel view actuators can be used to initiate selected channel view requests from the thread summary communication pane 530.

Figure 21:
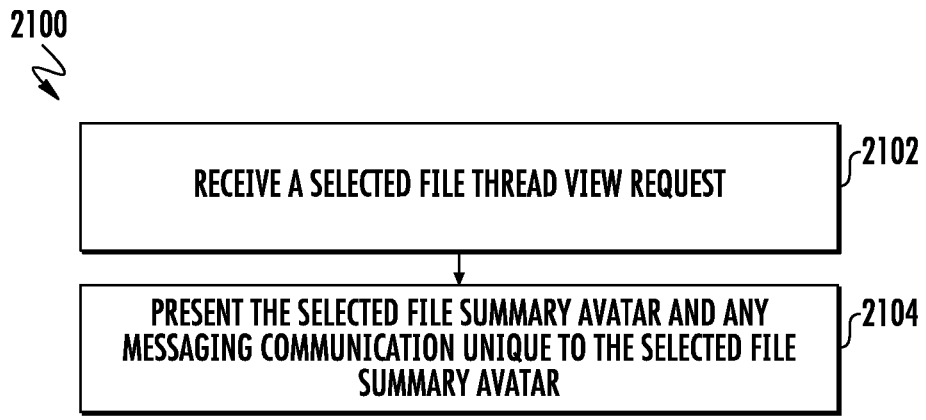
FIG. 21 illustrates a flow diagram of an example system in accordance with some embodiments discussed herein.

From the thread summary communication pane shown in FIG. 5, a user may select a particular file thread to view. FIG. 21 illustrates a flow diagram of an example system in accordance with some embodiments discussed herein. In particular, FIG. 21 illustrates a method 2100 involving the receipt of a selected file thread view request. The method 2100 includes receiving a selected file thread view request 2102, and presenting the selected file summary avatar and any messaging communication unique to the selected file summary avatar 2104. The full file thread may be viewed. That is, the respective file summary avatar and all messaging communications unique to the file summary avatar and file share request that led to the file summary avatar may be viewed.

In the embodiment illustrated in FIG. 5, a profile identifier 539 is received in the thread communication message 532E ("@matt"). The profile identifier 539 is configured to initiate a follow request for the member associated with the profile identifier 539 if the member is a member of the selected group-based communication channel from which the thread was created. If the profile identifier is associated with a user that is not a member of the selected group-based communication, then a join request may be initiated to present an invitation to join the channel to the user.

In response to the follow request, the selected group-based communication interface generates and/or modifies a thread indication to indicate that a new thread communication message has been received for the member's attention. For instance, in the embodiment illustrated in FIG. 5, the profile identifier 539 was received in the thread communication message 532E, which initiated a follow request for the member ("Matt") associated with the profile identifier 539 ("@matt"). The thread indication 502 was highlighted to indicate that a new thread communication message (the thread communication message 532E) was received for the member's attention. Once the selected group-based communication interface displays the new thread communication message to the member, the highlight will be removed. However, the member is now following the file thread. The member can unfollow the file thread by selecting a follow/unfollow actuator as discussed with regards to FIG. 4b and for example shown in the thread communication pane 420 (see follow/unfollow actuator 426). The thread communication pane can be accessed from the thread summary communication pane 530 by selecting a selected thread view actuator, which initiates a selected thread view request. In response to the selected thread view request, the thread communication pane is displayed with the selected thread. For instance, in the embodiment illustrated in FIG. 5, thread summary indicators 537A and 537B can be configured to be selectable by a member, initiating a selected file thread view request.

Figure 19:
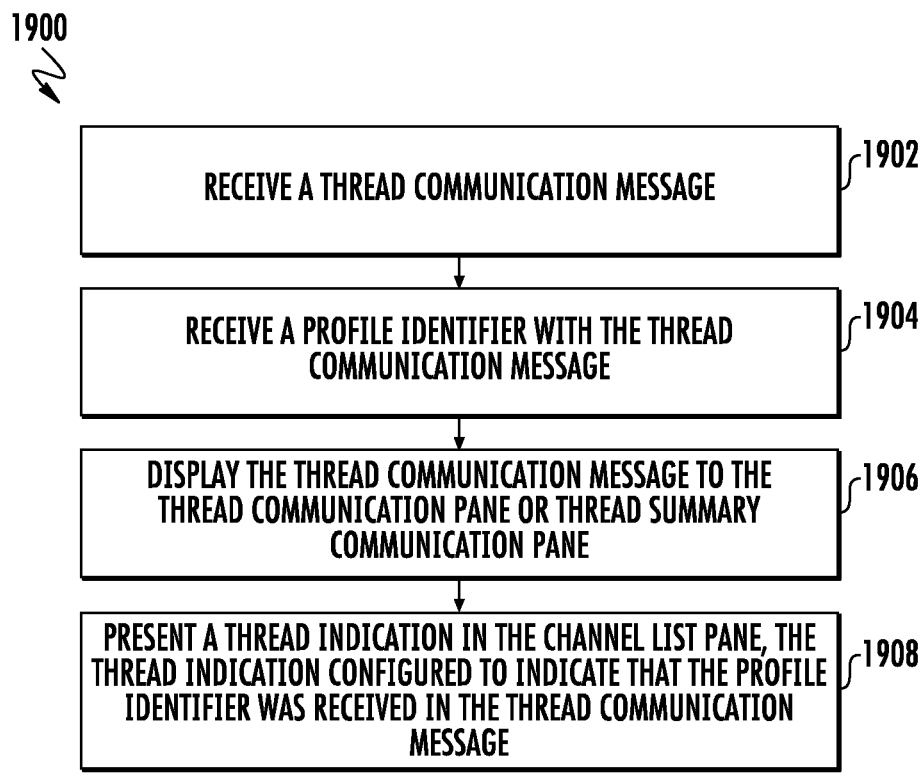
FIG. 19 illustrates a flow diagram of an example system in accordance with some embodiments discussed herein.

FIG. 19 illustrates a flow diagram of an example system in accordance with some embodiments discussed herein. In particular, FIG. 19 illustrates a method 1900 involving the receipt of a profile identifier. The method 1900 includes receiving a thread communication message 1902, receiving a profile identifier with the thread communication message 1904, displaying the thread communication message to the thread communication pane or thread summary communication pane 1906, and updating a thread indication in the channel list pane, the thread indication configured to indicate that the profile identifier was received in the thread communication message 1908.

Figure 6:
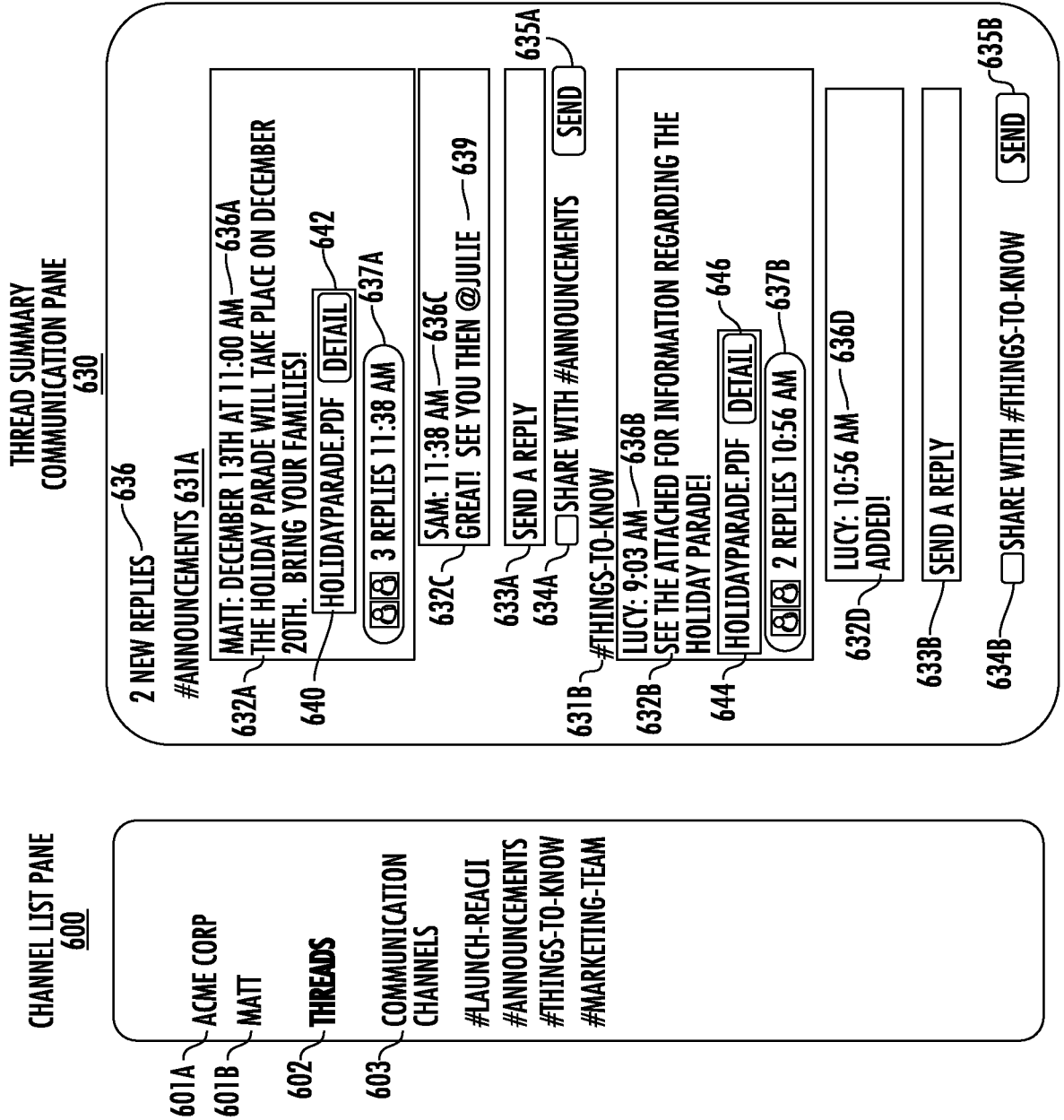
FIG. 6 illustrates an example group-based communication interface having a channel list pane and a thread summary communication pane in accordance with some embodiments discussed herein.

FIG. 6 illustrates an example group-based communication interface having a channel list pane 600 and a thread summary communication pane 630 in accordance with some embodiments discussed herein. The channel list pane 600 includes a thread indication 602, communication channel indications 603 (e.g., identifying channels that the member follows), the name of the group 601A ("ACME Corp"), and the name of the particular member 601B ("Matt") viewing the interface.

FIG. 6 illustrates the display of the file thread summaries including file summary avatars 640, 644 and respective introductory messaging communications 632A, 632B. Messaging communication information 636a, 636b is included with the introductory messaging communications 632A, 632B and the file summary avatars 640, 644, as well as file detail actuators 642, 646 and thread summary indicators 637a, 637b. In the embodiment illustrated in FIG. 6, the messaging communication information 636a, 636b includes a profile identifier and the time and date of receipt of the respective group-based messaging communication. Various information can be included in the messaging communication information 636a, 636b.

In some embodiments, the thread indication 602 may be configured as a thread summary view actuator to initiate a thread summary view request. The selected group-based communication interface is configured to receive a thread summary view request and in response to receipt of the thread summary view request, present a thread summary communication pane 630 displaying a summary of each thread that the member follows including file threads. For instance, in the embodiment illustrated in FIG. 6, selection of the thread indication 602 (i.e., "Threads") can be configured to initiate a thread summary view request to view a summary of each thread that the member ("Matt") follows, as is shown in the thread summary communication pane 630. Various configurations of thread summary view actuators can be used to initiate thread summary view requests from the channel list pane 600.

In the embodiment illustrated in FIG. 6, the thread indication 602 is bolded to indicate that one or more new thread communication messages for the member's attention have been received. The thread indication 602 can be highlighted or marked in various ways to draw the member's attention to the thread. Once the new thread communication message is displayed by the selected group-based communication interface to the member, the bolded font may be removed.

The thread summary communication pane 630 displays a summary of the threads that the member follows including the file threads the member follows. As shown in FIG. 6, for each thread summary, the thread summary communication pane 630 includes the name of the group-based communication channel from which the thread was created 631A-631B, the selected group-based messaging communication (e.g., the introductory messaging communication) 632A-632B and/or file summary avatar 640, 644 from which the thread was created, and thread communication messages received in the thread 632C-632D. For each thread summary, the thread summary communication pane 630 also includes a thread communication input register 633A-633B, a broadcast actuator 634A-634B, and a thread messaging actuator 635A-635B. The thread communication input registers 633A-633B are configured to receive thread communication messages from a member. The thread messaging actuators 635A-635B (e.g., buttons) can be selected by a member and initiate transmission of the respective thread communication message inserted into the thread communication input register 633A-633B to the circuitry 200 for processing. The thread communication message is then displayed in the thread summary communication pane 630.

In the embodiment illustrated in FIG. 6, the thread summary communication pane 630 displays a summary of a thread from the "announcements" group-based communication channel and a summary of a thread from the "things-to-know" group-based communication channel. Each of the selected group-based messaging communication (e.g., introductory messaging communication) 632A-632B and/or file summary avatars 640, 644 from which the respective thread was created and the thread communication messages received in the thread 632C-632D include messaging communication information 636A-636D. The messaging communication information 636A-636D includes a profile identifier and the time and/or date of receipt of the respective group-based messaging communication or thread communication message. The thread summary communication pane 630 may include other identifying information for each thread (e.g., members of communication channel, etc.). Each of the selected group-based messaging communications (e.g., introductory messaging communications) 632A-632B and/or file summary avatars 640, 644 from which the respective thread was created includes a thread summary indicator 637A and 637B. In the embodiment illustrated in FIG. 6, the thread summary indicators 637A and 637B include the number of thread communication messages received in the file thread (e.g., "3 Replies" or "2 Replies") (i.e., the thread count), a profile identifier (e.g., avatar) for each member who submitted a thread communication message(s), and include a latency indicator (e.g., "11:38 AM" or "10:56 AM") that indicates the time of receipt for the latest thread communication message in the respective file thread. A variety of information can be displayed in the thread summary indicators.

As noted above, the thread summary communication pane 630 includes the name of the group-based communication channel from which each file thread was created (e.g., "announcements" and "things-to-know"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 6, selection of the name of the group-based communication channel (e.g., "announcements") from which the first thread was created can be configured to initiate a selected channel view request to view the "announcements" channel (e.g., as shown in FIG. 4b in the channel messaging pane 410). Various configurations of selected channel view actuators can be used to initiate selected channel view requests from the thread summary communication pane 630.

In some embodiments, the introductory messaging communications 632a, 632b can be configured to initiate selected channel view requests, and/or selected thread view requests (e.g., file thread view requests).

In the embodiment illustrated in FIG. 6, a profile identifier 639 is received in the thread communication message 632C ("@julie"). The profile identifier 639 is configured to initiate a follow request for the member associated with the profile identifier 639. In response to the follow request, the selected group-based communication interface generates and/or modifies a thread indication to indicate that a new thread communication message has been received for the member's attention. For instance, in the embodiment illustrated in FIG. 6, the profile identifier 639 was received in the thread communication message 632C, which initiated a follow request for the member ("Julie") associated with the profile identifier 639 ("@julie"). The thread indication for the member would then be highlighted to indicate that a new thread communication message (the thread communication message 632C) was received for the member's attention.

As explained with regards to FIG. 5, the full file thread can be accessed from the thread summary communication pane by selecting a selected file thread view actuator, which initiates a file thread view request. In response to the file thread view request, the full file thread may be displayed. For instance, the thread communication pane may be displayed with the selected file thread. For instance, in the embodiment illustrated in FIG. 6, thread summary indicators 637A and 637B can be configured to be selectable by a member, initiating a file thread view request.

In the embodiment illustrated in FIG. 6, notification 636 is displayed in the thread summary communication pane 630. The notification 636 includes the number of new thread communication messages ("2 replies") and may also include the number of new threads (e.g., "2 new threads"). The notification 636 can include any desired information regarding the receipt of new thread communication messages (e.g., date and time of new thread communication messages, names of group-based communication channels from which the threads were created, etc.). The new threads can refer to file threads in which the member has been associated with through a profile identifier and/or file threads created from selected group-based messaging communications that the member authored (that is, the member submitted the file share request or the file thread request). The new thread communication messages can similarly refer to thread communication messages received in threads the member follows and/or thread communication messages in which the member has been associated with through a profile identifier. Referring back to FIG. 5, the particular member "Matt" was associated with the thread communication message 532E with the receipt of the profile identifier 539. Accordingly, a notification would notify the member of a new thread and a new thread communication message.

FIG. 7 illustrates an example group-based communication interface having a channel list pane, a thread summary communication pane, and a thread communication pane in accordance with some embodiments discussed herein. The channel list pane 700 includes a thread indication 702, communication channel indications 703 (e.g., identifying channels that the member follows), the name of the group 701A ("ACME Corp"), and the name of the particular member 701B ("Matt") viewing the interface.

FIG. 7 illustrates the display of the file thread summaries and a selected file thread including file summary avatars 740, 744, 748 and respective introductory messaging communications 732A, 732B, 721. Messaging communication information 736a, 736b, 727 is included with the introductory messaging communications 732A, 732B, 721 and the file summary avatars 740, 744, 748, as well as file detail actuators 742, 746, 750. Thread summary indicators 737a, 737b are also shown in the thread summary communication pane 730. In the embodiment illustrated in FIG. 7, the messaging communication information 732A, 732B, 721 includes a profile identifier and the time and date of receipt of the respective group-based messaging communication. Various information can be included in the messaging communication information 732A, 732B, 721.

In some embodiments, the thread indication 702 may be configured as a thread summary view actuator to initiate a thread summary view request. The selected group-based communication interface is configured to receive a thread summary view request and in response to receipt of the thread summary view request, present a thread summary communication pane 730 displaying a summary of each thread that the member follows including file threads. For instance, in the embodiment illustrated in FIG. 7, selection of the thread indication 702 (i.e., "Threads") can be configured as a thread summary view actuator to initiate a thread summary view request to view a summary of each thread that the member ("Matt") follows, as is shown in the thread summary communication pane 730. Various configurations of thread summary view actuators can be used to initiate thread summary view requests from the channel list pane 700.

In the embodiment illustrated in FIG. 7, the thread indication 702 is not bolded since the new thread communication messages have been displayed by the selected group-based communication interface to the member.

The thread summary communication pane 730 displays a summary of the threads that the member follows including the file threads. As shown in FIG. 7, for each thread summary, the thread summary communication pane 730 includes the name of the group-based communication channel from which the file thread was created 731A-731B, the selected group-based messaging communication (e.g., the introductory messaging communication) 732A-732B and/or file summary avatar 740, 744 from which the file thread was created, and thread communication messages received in the file thread 732C-732D. For each file thread summary, the thread summary communication pane 730 also includes a thread communication input register 733A-733B, a broadcast actuator 734A-734B, and a thread messaging actuator 735A-735B. The thread communication input registers 733A-733B are configured to receive thread communication messages from a member. The thread messaging actuators 735A-735B (e.g., buttons) can be selected by a member and initiate transmission of the respective thread communication message inserted into the thread communication input register 733A-733B to the circuitry 200 for processing. The thread communication message is then displayed in the thread summary communication pane 630.

In the embodiment illustrated in FIG. 7, the thread summary communication pane 730 displays a summary of a thread from the "announcements" group-based communication channel and a summary of a thread from the "things-to-know" group-based communication channel. Each of the selected group-based messaging communication (e.g., introductory messaging communication) and/or file summary avatars from which the respective thread was created 732A-732B and the thread communication messages received in the thread 732C-732D include messaging communication information 736A-736D. The messaging communication information 736A-736D includes a profile identifier and the time and/or date of receipt of the respective group-based messaging communication or thread communication message. The thread summary communication pane 730 may include other identifying information for each thread (e.g., members of communication channel, etc.). Each of the selected group-based messaging communications (e.g., introductory messaging communication) and/or file summary avatars from which the respective file thread was created 732A-732B includes a thread summary indicator 737A and 737B. In the embodiment illustrated in FIG. 7, the thread summary indicators 737A and 737B include the number of thread communication messages received in the thread (e.g., "3 Replies" or "2 Replies") (i.e., the thread count), a profile identifier (e.g., avatar) for each member who submitted a thread communication message(s), and include a latency indicator (e.g., "11:38 AM" or "10:56 AM") that indicates the time of receipt for the latest thread communication message in the respective thread. A variety of information can be displayed in the thread summary indicators.

As noted above, the thread summary communication pane 730 includes the name of the group-based communication channel from which each thread was created (e.g., "announcements" and "things-to-know"). In the embodiment illustrated in FIG. 7 the name of the group-based communication channel can be configured as a selected channel view actuator to initiate a selected channel view request. For instance, in the embodiment illustrated in FIG. 7, selection of the name of the group-based communication channel (e.g., "announcements") from which the first thread was created can be configured as a selected channel view actuator to initiate a selected channel view request to view the "announcements" channel (e.g., as shown in FIG. 4b in the channel messaging pane 410). Various configurations of selected channel view actuators can be used to initiate selected channel view requests from the thread summary communication pane 730.

In the embodiment illustrated in FIG. 7, a profile identifier 739 is received in the thread communication message 732C ("@julie"). Similar to the embodiment illustrated in FIG. 6, the profile identifier 739 is configured to initiate a follow request for the member associated with the profile identifier 739. In response to the follow request, the selected group-based communication interface generates and/or modifies a thread indication to indicate that a new thread communication message has been received for the member's attention.

As explained with regards to FIG. 5, full file threads can be accessed from the thread summary communication pane by selecting a file thread view actuator, which initiates a file thread view request. In response to the file thread view request, the thread communication pane is displayed with the selected file thread. For instance, in the embodiment illustrated in FIG. 7, thread summary indicator 737A has been selected, initiating a file thread view request. In response to receipt of the file thread view request, the selected file thread is displayed in the thread communication pane 720.

The thread communication pane 720 includes a thread-based introductory messaging communication 721 associated with the introductory messaging communication 732A displayed in the thread summary communication pane 730. The thread communication pane 720 also includes thread communication messages 722A-722C. Each of the thread communication messages 722A-722C and the thread-based introductory messaging communication 721 includes messaging communication information 727 and 728A-728C. The messaging communication information 727 and 728A-728C includes a profile identifier and the time and/or date of receipt of the respective messaging communication. The messaging communication information 727 also includes the name of the group-based communication channel from which the thread was created (e.g., "announcements"). In some embodiments, the name of the group-based communication channel can be configured as a selected channel view actuator to initiate a selected channel view request to view a channel messaging pane displaying the selected group-based communication channel associated with the selected channel view request.

The thread communication pane 720 also includes a thread communication input register 723, a broadcast actuator 724, a thread messaging actuator 725, and a follow/unfollow actuator 726. The thread communication input register 723 is configured to receive thread communication messages from a member. The thread messaging actuator 725 (e.g., a button) can be selected by a member and initiates transmission of the thread communication message inserted into the thread communication input register 723 to the circuitry 200 for processing. The thread communication message is then displayed in the thread communication pane 720.

Similar to the embodiment illustrated in FIG. 4b, the follow/unfollow actuator 426 is selectable by a member of the group-based communication channel from which the thread was created and initiates a request to either follow the respective thread or unfollow the respective thread. In response to a follow request, the thread indication (e.g., thread indication 702) in the channel list pane is configured to indicate that the follow request was received. The group-based communication interface will update the thread summary communication pane to include the respective thread. The group-based communication interface will highlight the thread indication if new thread communication messages are received in the followed thread. The follow/unfollow actuator 726 may also be modified to display "unfollow" (e.g., as shown in FIG. 7) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 726 may also be modified to display "follow" in response to receiving the follow request (e.g., as shown in FIG. 4b).

Figure 8:
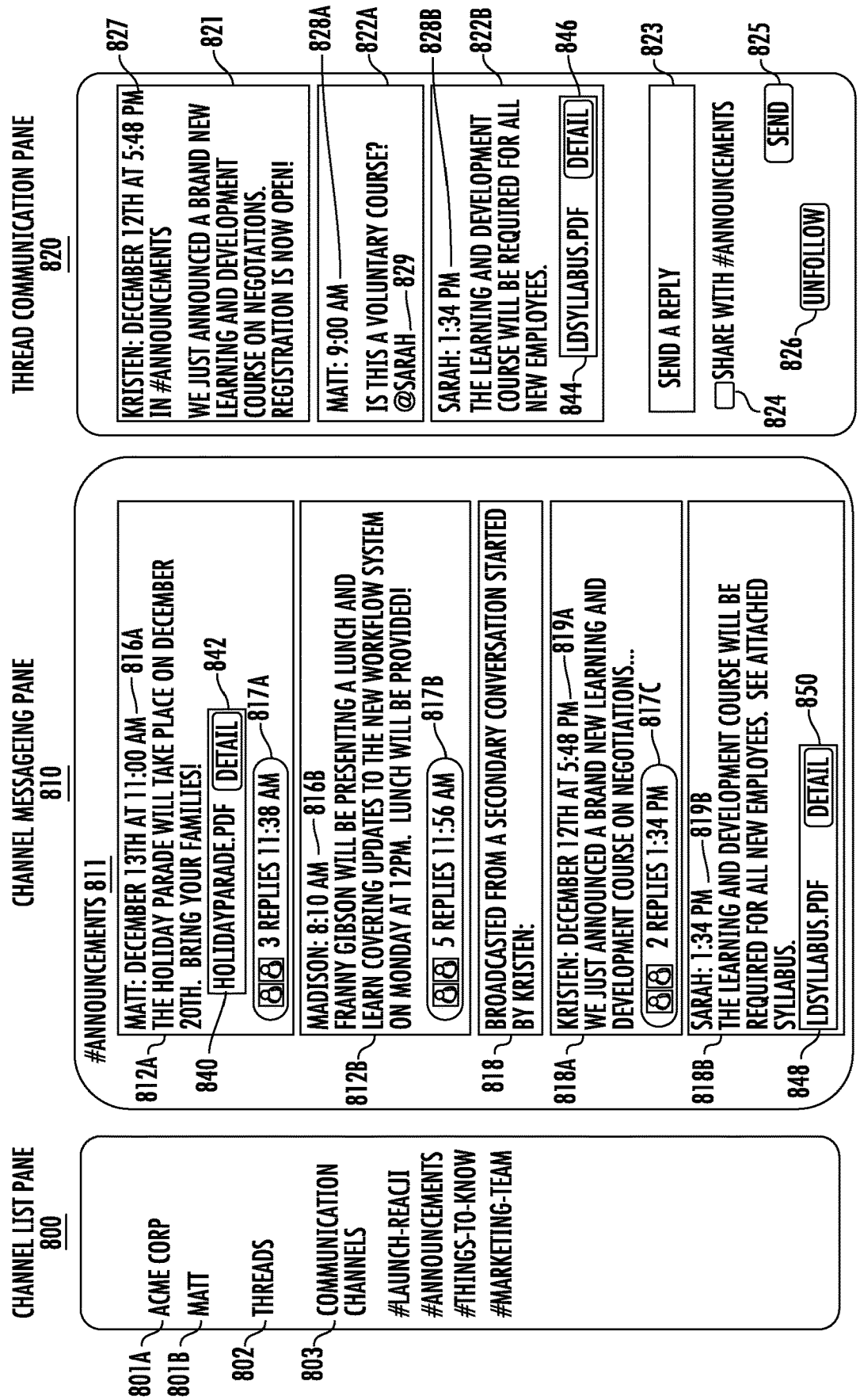
FIG. 8 illustrates an example group-based communication interface having a channel list pane, a channel messaging pane, and a thread communication pane in accordance with some embodiments discussed herein.
Figure 9:
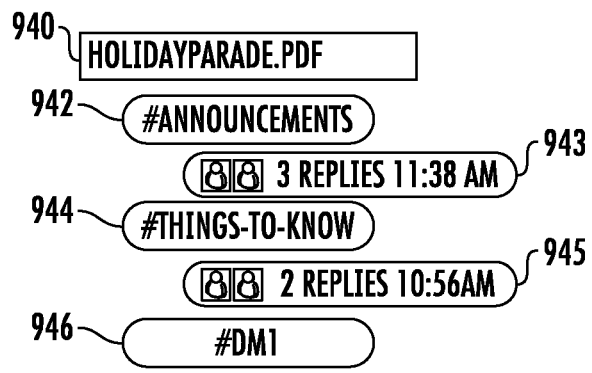
FIG. 9 illustrates an example group-based communication interface having a detail pane in accordance with some embodiments discussed herein.

In some embodiments, a file share request may be initiated in a thread (e.g., a file thread or a general thread). For instance, as shown in FIG. 8, a thread was created from the selected group-based communication channel and appears in the thread communication pane 820. The thread includes an introductory messaging communication 822b and file summary avatar 844 as well as a file detail actuator 846. The file summary avatar 844 may be user engageable such that a member of the selected group-based communication channel can access the file associated with the file summary avatar 844. Subsequent thread communication messages may be received in the thread communication input register 823 and submitted via the thread messaging actuator 825.

Figure 17:
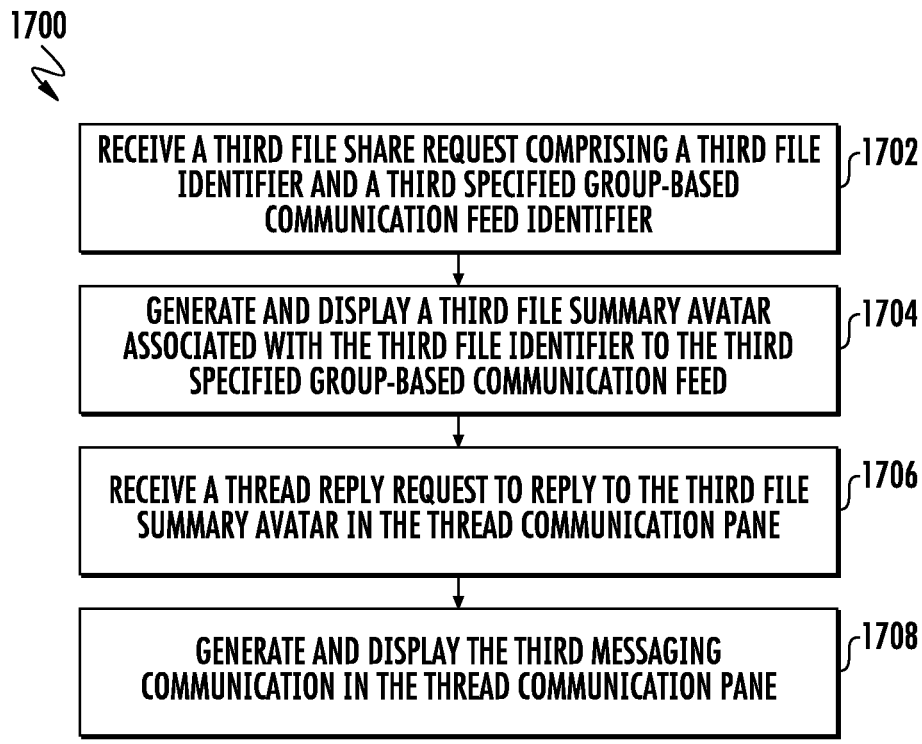
FIG. 17 illustrates a flow diagram of an example system in accordance with some embodiments discussed herein.

FIG. 17 illustrates a flow diagram of an example system in accordance with some embodiments discussed herein. In particular, FIG. 17 illustrates a method when a file share request is received in a thread (e.g., a file thread or general thread). The method 1700 illustrated in FIG. 17 includes receiving a third file share request comprising a third file identifier and a third specified group-based communication feed identifier 1702 and generating and displaying a third file summary avatar associated with the third file identifier to the third specified group-based communication feed 1704. While not required, the method 1700 may also include receiving a thread reply request to reply to the third file summary avatar in the thread communication pane 1706, and generating and displaying the third messaging communication in the thread communication pane 1708.

In some embodiments, it may be beneficial to notify the members of a selected group-based communication channel of certain files and/or communications in a thread stemming from that selected group-based communication channel. For instance, a member may share a file in a thread that is relevant to other members of the selected group-based communication channel. The members participating in the thread can share the file and introductory messaging communication to the selected group-based communication channel to quickly identify information that the other members of the selected group-based communication channel need to be made aware. For instance, FIG. 8 illustrates an example group-based communication interface having a channel list pane, a channel messaging pane, and a thread communication pane in accordance with some embodiments discussed herein. In particular, FIG. 8 illustrates a group-based communication interface having a channel list pane 800, channel messaging pane 810, and thread communication pane 820. The channel list pane 800 includes a thread indication 802, communication channel indications 803 (e.g., identifying channels that the member follows), the name of the group 801A ("ACME Corp"), and the name of the particular member 801B ("Matt").

FIG. 8 illustrates the display of a selected group-based communication feed (e.g., a selected group-based communication channel) and a selected thread including file summary avatars 840, 844, 848 and respective introductory messaging communications 812A, 818B, 822b. Messaging communication information 816a, 819b, 828b is included with the introductory messaging communications 812A, 818B, 822b and the file summary avatars 840, 844, 848, as well as file detail actuators 842, 846, 850. Thread summary indicators 817a, 817b, 817c are also shown in the interface. In the embodiment illustrated in FIG. 8, the messaging communication information 816a, 819b, 828b includes a profile identifier and the time and date of receipt of the respective group-based messaging communication. Various information can be included in the messaging communication information 816a, 819b, 828b.

The channel messaging pane 810 includes a selected group-based communication channel 811 ("announcements") which includes a feed of group-based messaging communications 812A-812B (group-based messaging communication 812a is an introductory messaging communication). Each group-based messaging communication 812A-812B includes messaging communication information 816A-816B. The messaging communication information 816A-816B includes a profile identifier and the time and date of receipt of the respective group-based messaging communication. The channel messaging pane 810 also shows the name of the selected group-based communication channel 811 and may include other identifying information for the group-based communication channel (e.g., date of creation, time of last messaging communication, members of communication channel, etc.). Both group-based messaging communications 812A-812B have had threads stem from the communications. Accordingly, each group-based messaging communication 812A-812B has a thread summary indicator 817A-817B, respectively, attached to the communications. In the embodiment illustrated in FIG. 8, the thread summary indicators 817A and 817B include the number of thread communication messages received in the thread (e.g., "3 Replies" or "5 Replies") (i.e., the thread count), a profile identifier (e.g., avatar) for each member who submitted a thread communication message(s), and include a latency indicator (e.g., "11:38 AM" or "11:56 AM") that indicates the time of receipt for the latest thread communication message in the respective thread. The thread summary indicators 817A-817B can be configured as selected thread view actuators to initiate a selected thread view request. As noted previously, the selected group-based communication interface is configured to receive selected thread view requests and in response to receipt of selected thread view requests, present a thread communication pane displaying the selected thread associated with the selected thread view request. For instance, in the embodiment illustrated in FIG. 8, selection of either of the thread summary indicators 817A-817B can be configured as a selected thread view actuator to initiate a selected thread view request to view the full thread stemming from the selected group-based messaging communication associated with the respective thread summary indicator.

The thread communication pane 820 includes a subsidiary messaging communication 821 associated with the respective group-based messaging communication of the group-based communication channel from which the displayed thread was created. The thread communication pane 820 also includes thread communication messages 822A-822B (thread communication message 822b is a thread-based introductory messaging communication). Each of the thread communication messages 822A-822B and the subsidiary messaging communication 821 includes messaging communication information 827 and 828A-828B. The messaging communication information 827 and 828A-828B includes a profile identifier and the time of receipt of the respective group-based messaging communication. The messaging communication information 827 also includes the name of the group-based communication channel from which the thread was created. In some embodiments, the name of the group-based communication channel can be configured as a selected channel view actuator to initiate a selected channel view request. As noted previously, the selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 8, selection of the name of the group-based communication channel from which the thread was created can be configured as a selected channel view actuator to initiate a selected channel view request to view the "announcements" channel. Various configurations of selected channel view actuators can be used to initiate selected channel view requests from the thread communication pane 820.

The thread communication pane 820 also includes a thread communication input register 823, a broadcast actuator 824, a thread messaging actuator 825, and an follow/unfollow actuator 826. The thread communication input register 823 is configured to receive thread communication messages from a member. The thread messaging actuator 825 (e.g., a button) can be selected by a member and initiates transmission of the thread communication message inserted into the thread communication input register 823 to the circuitry 200 for processing. The thread communication message is then displayed in the thread communication pane 820.

The follow/unfollow actuator 826 is also selectable by a member of the group-based communication channel from which the thread was created and initiates a request to either follow the respective thread or unfollow the respective thread. In response to a follow request, the group-based communication interface will update a thread indication (e.g., thread indication 802) in the channel list pane, where the thread indication is configured to indicate that the follow request was received. The group-based communication interface will highlight the thread indication if new thread communication messages are received in the followed thread. The follow/unfollow actuator 826 may also be modified to display "unfollow" (as shown in FIG. 8) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 826 may also be modified to display "follow" in response to receiving the follow request.

In the embodiment illustrated in FIG. 8, thread communication message 822B has been broadcasted to the group-based communication channel from which the thread was created. The broadcast actuator 824 was selected by a member of the group-based communication channel, which initiated a broadcast request. In response to the broadcast request, the thread-based introductory messaging communication 822B was reproduced in the channel messaging pane 810 displaying the selected group-based communication channel as broadcasted thread communication message 818B. The subsidiary messaging communication 821 was also reproduced as broadcasted thread communication message 818A to provide context to the shared communication. The two broadcasted thread communication messages 818A and 818B may be distinguished in the channel messaging pane 810 by a broadcast indicator 818 and/or by changes in format (e.g., by off-setting the communications such as shown in FIG. 8 or other ways of distinguishing the communications). The broadcasted thread communication messages 818A and 818B include messaging communication information 819A and 819B. The messaging communication information 819A-819B include a profile identifier and the time and/or date of receipt of the respective communication. A thread summary indicator 817C is also included with the broadcasted thread communication message 818A. In the embodiment illustrated in FIG. 8, the thread summary indicator 817C includes the number of thread communication messages received in the thread (e.g., "2 Replies") (i.e., the thread count), a profile identifier (e.g., avatar) for each member who submitted a thread communication message(s), and includes a latency indicator (e.g., "1:34 PM") that indicates the time of receipt for the latest thread communication message in the respective thread. The thread summary indicator 817C can be configured as a selected thread view actuator to initiate a selected thread view request to view the full thread.

While not illustrated in FIG. 8, the channel messaging pane 810 may also include a channel communication input register and a channel messaging actuator, as described herein. The channel list pane 800, channel messaging pane 810, and thread communication pane 820 may also include other actuators, indicators, and messaging communication information without deviating from the intent of the present invention.

Figure 16:
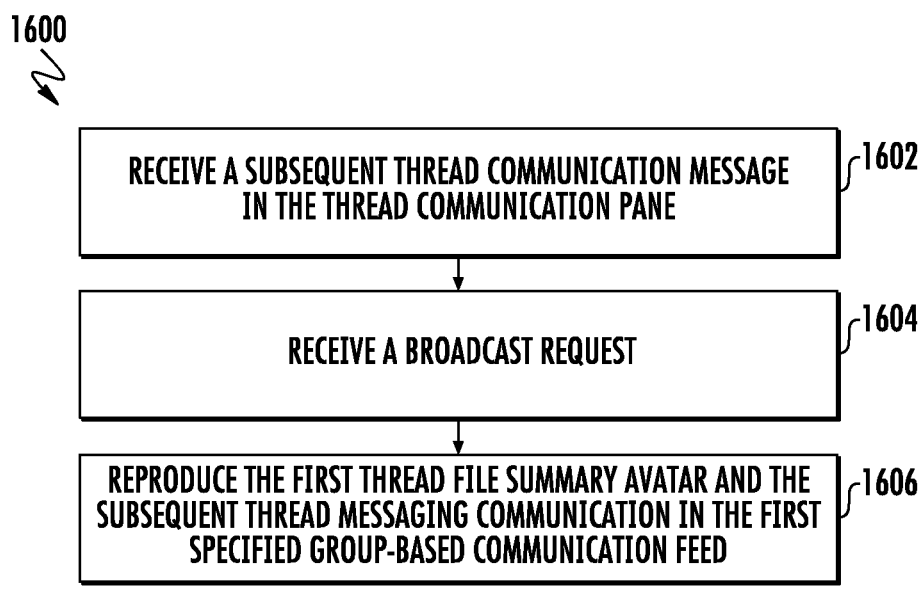
FIG. 16 illustrates a flow diagram of an example system in accordance with some embodiments discussed herein.

FIG. 16 illustrates a flow diagram of an example system in accordance with some embodiments discussed herein. In particular, FIG. 16 illustrates a method of broadcasting thread communication messages back to the selected group-based communication channel from which the thread was created. The method 1600 illustrated in FIG. 16 includes receiving a subsequent thread communication message in the thread communication pane 1602, receiving a broadcast request 1604, and reproducing the first thread file summary avatar and the subsequent thread messaging communication in the first specified group-based communication feed 1606. Other members of the selected group-based communication channel can then access the thread by selecting a thread summary indicator, initiating a selected thread view request to view the full thread. In response to the selected thread view request, the selected group-based communication interface then presents each thread communication message of the selected thread in the thread communication pane.

Figure 12:
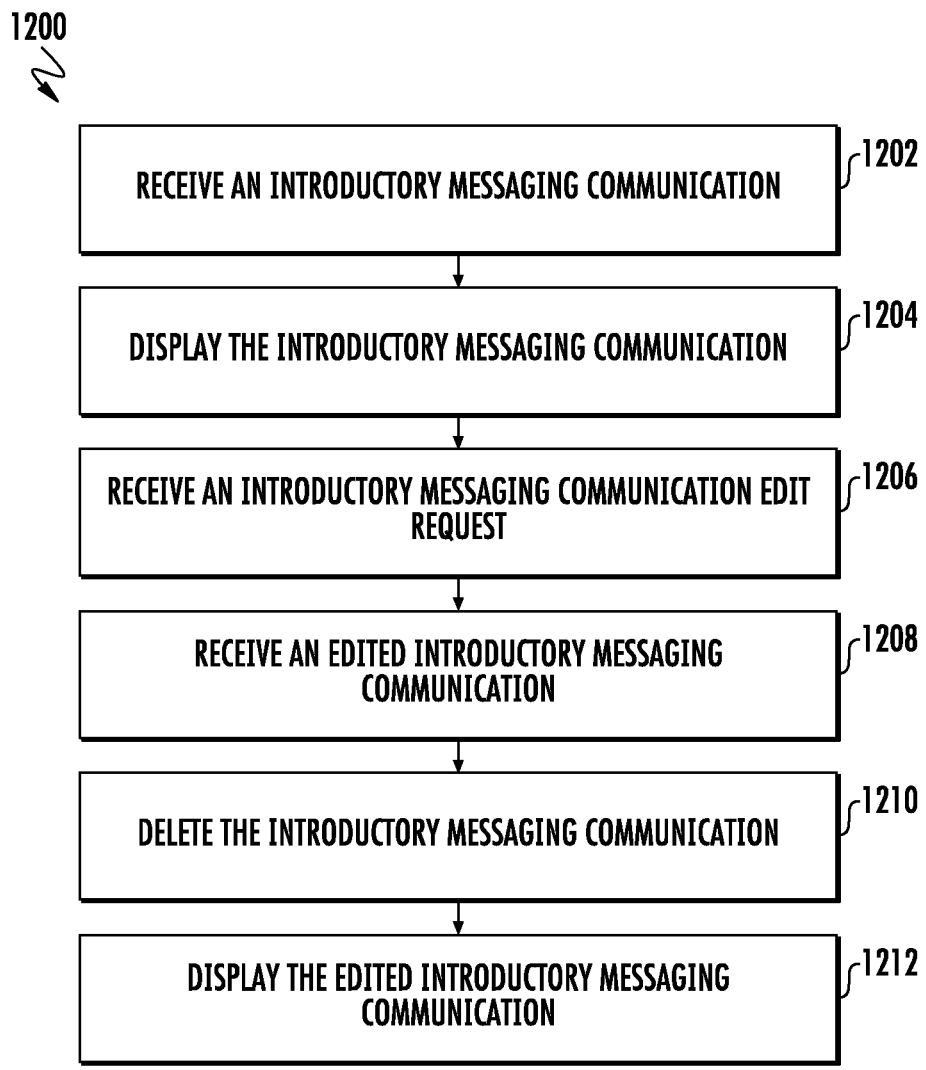
FIG. 12 illustrates a flow diagram of an example system in accordance with some embodiments discussed herein.

In some embodiments, the introductory messaging communication may be modified. For instance, in some embodiments, an introductory messaging communication (e.g., a thread-based introductory messaging communication, channel-based introductory messaging communication, etc.) may be edited to display a different message than the original introductory messaging communication. FIG. 12 illustrates a flow diagram of an example system in accordance with some embodiments discussed herein. In particular, FIG. 12 illustrates a method of editing an introductory messaging communication. The method 1200 illustrated in FIG. 12 includes receiving an introductory messaging communication 1202, displaying the introductory messaging communication 1204, receiving an introductory messaging communication edit request 1206, receiving an edited introductory messaging communication 1208, deleting the introductory messaging communication 1210, and displaying the edited introductory messaging communication 1212.

Figure 15:
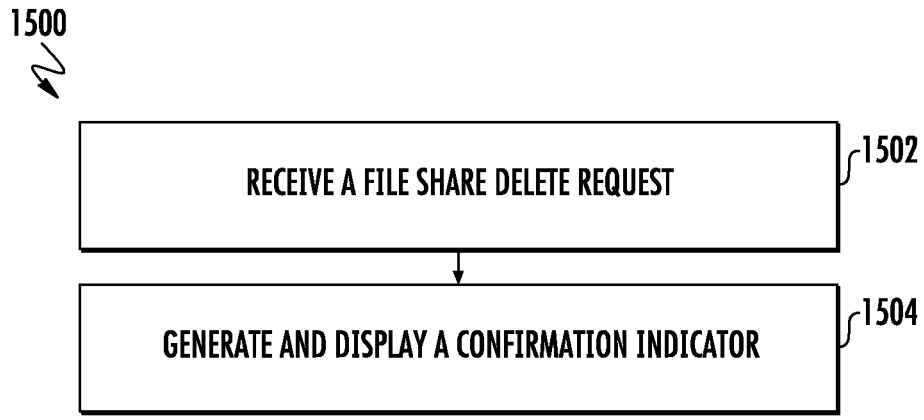
FIG. 15 illustrates a flow diagram of an example system in accordance with some embodiments discussed herein.

In some embodiments, a file share may be deleted. That is, in some embodiments, in each instance that a file is share, access to that file may be deleted at a later date. The file share may also be deleted (e.g., the introductory messaging communication and/or file summary avatar). FIG. 15 illustrates a flow diagram of an example system in accordance with some embodiments discussed herein. In particular, FIG. 15 illustrates a method of deleting access to a file in one or more file shares. The method 1500 illustrated in FIG. 15 includes receiving a file share delete request 1502 and generating and displaying a confirmation indicator 1504. Access to the file may be deleted in certain file shares or in all file shares. The confirmation indicator may indicate each file share and allow for deletion in one or more of the file shares. The confirmation indicator may also indicate whether the member owns the file (was the original member who uploaded the file). The member who originally uploaded the file may receive a notification. Once access to a file is deleted from a file share, the file share may no longer appear in the file details information and/or access to the file share may be restricted from the file details information though the file share is still listed. If all file shares are deleted, the file may not be searchable in the group-based communication interface.

Figure 18:
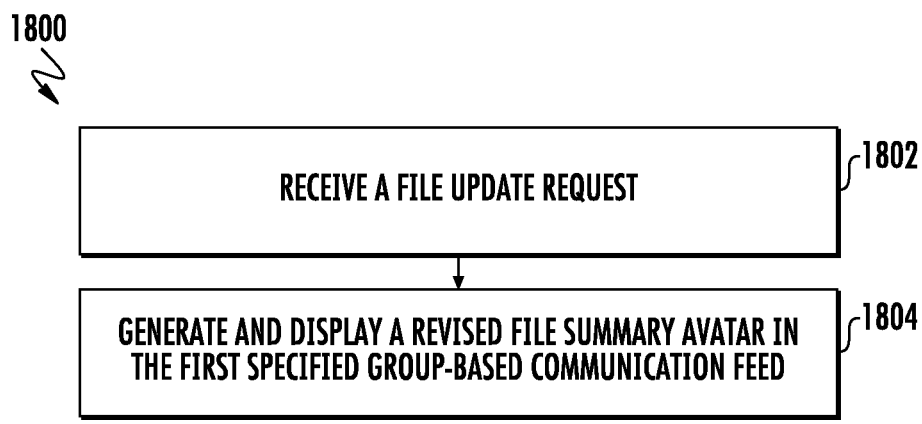
FIG. 18 illustrates a flow diagram of an example system in accordance with some embodiments discussed herein.

In some embodiments, a file may be edited. That is, in some embodiments, a file may be updated, modified, or otherwise changed. FIG. 18 illustrates a flow diagram of an example system in accordance with some embodiments discussed herein. In particular, FIG. 18 illustrates a method of modifying a file. The method 1800 illustrated in FIG. 18 includes receiving a file update request 1802 and generating and displaying a revised file summary avatar in the first specified group-based communication feed 1804. For each instance that the file is shared, a revised file summary avatar may be generated and displayed in the respective group-based communication feed. Original file summary avatars may be deleted and replaced with the revised file summary avatars.

Some embodiments of the present invention also use a second screen, as discussed herein. For instance, a first screen may be presented to a first member while a second screen may be presented to a second member of the selected group-based communication interface. The format of a display pane, group-based communication channel, or thread may appear differently to different members of the interface; however, the content of a selected group-based communication channel (i.e., messaging communications) and thread stemming from that selected group-based communication channel will be displayed to each member of the channel. For instance, members or groups may have particular preference for layouts or text fonts. The particular preferences may be considered when generating the group-based communication channels and threads. The system may utilize any number of screens necessary to present the group-based communication interface in a meaningful way to each member of the interface.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus configured to share one or more files to a group-based communication interface comprising a plurality of group-based communication feeds, the apparatus comprising at least a processor, and a memory associated with the processor having computer coded instructions therein, with the computer coded instructions configured to, when executed by the processor, cause the apparatus to:

receive a first file share request comprising a first file identifier and a first specified group-based communication feed identifier, wherein the first specified group-based communication feed identifier is associated with a first specified group-based communication feed of the plurality of group-based communication feeds;

generate and transmit for display a first file summary avatar associated with the first file identifier renderable within the first specified group-based communication feed associated with the first specified group-based communication feed identifier, wherein the first file summary avatar comprises a first user engageable link for accessing a first file associated with the first file identifier;

receive a first file thread request associated with the first file summary avatar, the first file thread request comprising the first file identifier, the first specified group-based communication feed identifier, and a first thread messaging communication; and in response to receiving the first file thread request, generate and transmit for display the first thread messaging communication and a first thread file summary avatar renderable within a first subsidiary group-based communication feed associated with the first specified group-based communication feed, and generate and transmit for display a first thread summary indicator renderable within the first specified group-based communication feed proximate the first file summary avatar.

2. The apparatus according to claim 1, wherein the computer coded instructions are configured to, when executed by the processor, further cause the apparatus to:

receive a second file share request comprising a second file identifier and a second specified group-based communication feed identifier, wherein the second specified group-based communication feed identifier is associated with a second specified group-based communication feed of the plurality of group-based communication feeds;

generate and transmit for display a second file summary avatar associated with the second file identifier renderable within the second specified group-based communication feed associated with the second specified group-based communication feed identifier, wherein the second file summary avatar comprises a second user engageable link for accessing a second file associated with the first file identifier;

receive a second file thread request associated with the second file summary avatar, the second file thread request comprising the second file identifier, the second specified group-based communication feed identifier, and a second thread messaging communication; and in response to receiving the second file thread request, generate and transmit for display the second thread messaging communication and a second thread file summary avatar renderable within a second subsidiary group-based communication feed associated with the second specified group-based communication feed, and generate and transmit for display a second thread summary indicator renderable within the second specified group-based communication feed proximate the second file summary avatar.

3. The apparatus of claim 1, wherein the first subsidiary group-based communication feed is renderable for display within a thread communication pane in the group-based communication interface in response to receiving the first file thread request.

4. The apparatus of claim 1, wherein the first thread summary indicator comprises a thread count and a latency indicator.

5. The apparatus of claim 1, wherein the first file share request comprises an introductory messaging communication, wherein the introductory messaging communication is unique to the first file share request and the computer coded instructions are configured to, when executed by the processor, further cause the apparatus to transmit for display the introductory messaging communication renderable proximate to the first file summary avatar within the first specified group-based communication feed and renderable proximate the first thread file summary avatar within the first subsidiary group-based communication feed.

6. The apparatus of claim 5, wherein the computer coded instructions are configured to, when executed by the processor, further cause the apparatus to receive an introductory messaging communication edit request, receive an edited introductory messaging communication, delete the introductory messaging communication, and transmit for display the edited introductory messaging communication renderable proximate to the first file summary avatar within the first specified group-based communication feed and renderable proximate the first thread file summary avatar within the first subsidiary group-based communication feed.

7. The apparatus of claim 1, wherein the computer coded instructions are configured to, when executed by the processor, further cause the apparatus to receive a file detail request and in response to receipt of the file detail request, generate and transmit for display file detail information, wherein the file detail information indicates one or more group-based communication feeds that the first specified group-based communication interface is permitted to display and wherein at least one of a plurality of file summary avatars associated with the first file is renderable for display within the first specified group-based communication interface.

8. The apparatus of claim 7, wherein the file detail information comprises a messaging communication count respective to each file summary avatar of the plurality of file summary avatars associated with the first file.

9. The apparatus of claim 7, wherein the computer coded instructions are configured to, when executed by the processor, further cause the apparatus to receive a group-based communication feed request, the group-based communication feed request associated with a respective group-based communication feed, and in response to receipt of the group-based communication feed request, transmit for display the respective specified group-based communication feed.

10. The apparatus of claim 1, wherein the computer coded instructions are configured to, when executed by the processor, further cause the apparatus to receive a file share delete request;
in response to the file share delete request, generate and transmit for display a confirmation indicator, the confirmation indicator confirming removal of accessibility of the first file through each file summary avatar of a plurality of file summary avatars associated with the first file, and wherein the confirmation indicator indicates each specified group-based communication feed in which the first file has been made accessible if the first file has been made accessible in more than one specified group-based communication feed or more than once within the respective specified group-based communication feed; and
removing the accessibility of the first file through each file summary avatar.

11. The apparatus of claim 3, wherein the computer coded instructions are configured to, when executed by the processor, further cause the apparatus to:
receive a subsequent thread messaging communication associated with the thread communication pane and receive a broadcast request, the broadcast request configured to request that the subsequent thread messaging communication be reproduced, via transmission for display, and renderable within the first specified group-based communication feed; and
in response to receiving the broadcast request, transmit for display the first thread file summary avatar and the subsequent thread messaging communication renderable within the first specified group-based communication feed, wherein the first specified group-based communication feed is a group-based communication channel.

12. The apparatus of claim 3, wherein the computer coded instructions are configured to, when executed by the processor, further cause the apparatus to:
receive a third file share request comprising a third file identifier and a third specified group-based communication feed identifier, wherein the third specified group-based communication feed identifier is associated with a third specified group-based communication feed of the plurality of group-based communication feeds;
generate and transmit for display a third file summary avatar associated with the third file identifier renderable within the third specified group-based communication feed associated with the third specified group-based communication feed identifier, wherein the third file summary avatar comprises a third user engageable link for accessing a third file associated with the third file identifier.

13. The apparatus of claim 12, wherein the computer coded instructions are configured to, when executed by the processor, further cause the apparatus to:
receive a thread reply request representative of a reply to the third file summary avatar in the thread communication pane, the thread reply request associated with a third messaging communication;
in response to receiving the thread reply request, generate and transmit for display the third messaging communication renderable within the thread communication pane, wherein the third messaging communication is associated with the third file summary avatar and the first file summary avatar.

14. The apparatus of claim 1, wherein the computer coded instructions are configured to, when executed by the processor, further cause the apparatus to:
receive a file update request, the file update request being associated with a change to the first file, and
in response to receiving the file update request, generate and transmit for display a revised file summary avatar renderable within the first specified group-based communication feed, the revised file summary avatar comprising the change to the first file and replacing the first file summary avatar.

15. The apparatus of claim 3, wherein the computer coded instructions are configured to, when executed by the processor, further cause the apparatus to transmit for display messaging communication information associated with the first thread messaging communication renderable within the thread communication pane.

16. The apparatus of claim 3, wherein the computer coded instructions are configured to, when executed by the processor, further cause the apparatus to:
receive a profile identifier with a third messaging communication in the thread communication pane, wherein the profile identifier is configured to associate the third messaging communication with a user of a selected group-based communication interface;
transmit for display the profile identifier with the third messaging communication renderable within the thread communication pane; and
in response to receiving the profile identifier in the thread communication pane, transmit an update to a thread indication renderable in a channel list pane of the selected group-based communication interface, the thread indication configured to indicate that the profile identifier was received in the thread communication pane.

17. The apparatus of claim 3, wherein the computer coded instructions are configured to, when executed by the processor, further cause the apparatus to receive a thread summary view request and, in response to receiving the thread summary view request, transmitting for display at least a portion of the first file summary avatar renderable within a thread summary communication pane.

18. The apparatus of claim 17, wherein the computer coded instructions are configured to, when executed by the processor, further cause the apparatus to, in response to receiving the thread summary view request, transmit for display a notification renderable in the thread summary communication pane, wherein the notification is configured to indicate receipt of new messaging communications in the thread communication pane, the new messaging communications being messaging communications that a thread-associated user profile has not yet viewed.

19. The apparatus of claim 17, wherein the computer coded instructions are configured to, when executed by the processor, further cause the apparatus to receive a selected file thread view request, the selected file thread view request associated with a selected file summary avatar, and, in response to receiving the selected file thread view request, transmit for display the selected file summary avatar and any messaging communication unique to the selected file summary avatar.

20. The apparatus of claim 1, wherein the first file share request comprises a second file identifier and the computer coded instructions are configured to, when executed by the processor, further cause the apparatus to generate and transmit for display a second file summary avatar associated with the second file identifier renderable within the first specified group-based communication feed, wherein the second file summary avatar comprises a second user engageable link for accessing a second file associated with the second file identifier.

21. A computer-implemented method to share one or more files to a group-based communication interface comprising a plurality of group-based communication feeds, the method comprising:

receiving a first file share request comprising a first file identifier and a first specified group-based communication feed identifier, wherein the first specified group-based communication feed identifier is associated with a first specified group-based communication feed of the plurality of group-based communication feeds;
generating and transmitting for display a first file summary avatar associated with the first file identifier renderable within the first specified group-based communication feed associated with the first specified group-based communication feed identifier, wherein the first file summary avatar comprises a user engageable link for accessing a first file associated with the first file identifier;
receiving a first file thread request associated with the first file summary avatar, the first file thread request comprising the first file identifier, the first specified group-based communication feed identifier, and a first thread messaging communication; and
in response to receiving the first file thread request, generating and transmitting for display the first thread messaging communication and a first thread file summary avatar renderable within a subsidiary group-based communication feed associated with the first specified group-based communication feed, and generating and transmitting for display a first thread summary indicator renderable within the first specified group-based communication feed proximate the first file summary avatar.

22. A computer program product to share one or more files to a group-based communication interface comprising a plurality of group-based communication feeds is provided comprising a non-transitory computer readable medium having computer program instructions stored therein, said computer program instructions, when executed by a processor, cause the computer program product to:
receive a first file share request comprising a first file identifier and a first specified group-based communication feed identifier, wherein the first specified group-based communication feed identifier is associated with a first specified group-based communication feed of the plurality of group-based communication feeds;
generate and transmit for display a first file summary avatar associated with the first file identifier renderable within the first specified group-based communication feed associated with the first specified group-based communication feed identifier, wherein the first file summary avatar comprises a user engageable link for accessing a first file associated with the first file identifier;
receive a first file thread request associated with the first file summary avatar, the first file thread request comprising the first file identifier, the first specified group-based communication feed identifier, and a first thread messaging communication; and
in response to receiving the first file thread request, generate and transmit for display the first thread messaging communication and a first thread file summary avatar renderable within a subsidiary group-based communication feed associated with the first specified group-based communication feed, and generate and transmit for display a first thread summary indicator renderable within the first specified group-based communication feed proximate the first file summary avatar.

* * * * *